United States Patent [19]

Yoshioka et al.

[11] Patent Number: 5,377,247

[45] Date of Patent: Dec. 27, 1994

[54] FUEL ASSEMBLY OF NUCLEAR REACTOR

[75] Inventors: Ritsuo Yoshioka; Takeshi Seino; Toru Yamamoto, all of Yokohama; Yasushi Hirano, Kawasaki, all of Japan

[73] Assignee: Kabushiki Kaisha Toshiba, Kawasaki, Japan

[21] Appl. No.: 42,443

[22] Filed: Feb. 19, 1993

Related U.S. Application Data

[63] Continuation of Ser. No. 691,794, Apr. 26, 1991, abandoned.

[30] Foreign Application Priority Data

Apr. 27, 1990 [JP] Japan .................. 2-112719

[51] Int. Cl.$^5$ .............................. G21C 7/06
[52] U.S. Cl. .................... 376/428; 376/419; 376/422
[58] Field of Search ............ 376/435, 428, 419, 423, 376/422, 421, 349, 917, 212; 976/DIG. 96

[56] References Cited

U.S. PATENT DOCUMENTS

| | | | |
|---|---|---|---|
| 3,844,886 | 10/1974 | Crowther | 376/267 |
| 3,910,818 | 10/1975 | Sofer | 376/210 |
| 3,933,582 | 1/1976 | MacNabb | 376/419 |
| 4,293,380 | 10/1981 | Robbins | 376/209 |
| 4,629,599 | 12/1986 | Crowther et al. | 376/212 |
| 4,652,427 | 3/1987 | Uchikawa et al. | 376/447 |
| 4,668,468 | 5/1987 | Santucci | 376/419 |
| 4,863,680 | 9/1989 | Sakurada et al. | 376/444 |
| 4,968,479 | 11/1990 | Ogiya et al. | 376/428 |
| 5,089,210 | 2/1992 | Reese et al. | 376/212 |
| 5,145,635 | 9/1992 | Ishii et al. | 376/173 |
| 5,198,186 | 3/1993 | Ogiya et al. | 376/435 |

FOREIGN PATENT DOCUMENTS 63-108294  5/1988  Japan .

Primary Examiner—Donald P. Walsh
Assistant Examiner—Meena Chelliah
Attorney, Agent, or Firm—Foley & Lardner

[57] ABSTRACT

A nuclear reactor core is provided with a fuel assembly which comprises channel boxes respectively separated with spaces into which control rods are arranged and a plurality of fuel rods arranged in the channel box, at least a part of the fuel rods being charged with uranium-plutonium mixture fuel and an enrichment of U-235 or a concentration of plutonium, or both being distributed in an axial direction of the fuel rods. The concentration of a burnable poison packed in the fuel rod is distributed in the axial direction of the fuel assembly. The ratio of the occupying region of a moderator of the fuel assembly is increased with respect to the fuel occupying region. The number of the fuel rods containing the burnable poison is variously changed with respect to the total number of the fuel rods and the arranging mode thereof is also varied with the concentration thereof.

31 Claims, 30 Drawing Sheets

REASON FOR REDUCTION OF CORE SHUTDOWN
MARGIN IN MOX FUEL CHARGED CORE (BWR)

——— ONLY URANIUM FUEL CHARGED CORE

– – – MOX FUEL CHARGED CORE

REASON FOR INCREASING OF AXIAL OUTPUT
DISTRIBUTION IN MOX FUEL CHARGED CORE (BWR)

UPPER END

RELATION OF CONCENTRATION $1, 1' < 2, 2'$ $2, 2' < 3$

LOWER END

BASIC THEORY OF AXIAL DISTRIBUTION OF FISSILE
MATERIAL CONCENTRATION OF MOX FUEL ASSEMBLY $1, 1' < 2, 2'$ $2, 2' < 3$

BASIC THEORY OF AXIAL BURNABLE POISON
CONCENTRATION OF MOX FUEL ASSEMBLY

RELATION BETWEEN REPLACEABLE FUEL ROD NUMBER RATIO BY WATER ROD AND ABSOLUTE VALUE OF VOID REACTIVITY COEFFICIENT

BURNING VARIATION OF INFINITE MULTIPLICATION FACTOR OF A MOX FUEL ASSEMBLY AND A URANIUM FUEL ASSEMBLY (OPERATION MODE)

BURNING VARIATION OF MOX FUEL AND URANIUM FUEL (OPERATION MODE)

FIG. 23A
FIG. 23B
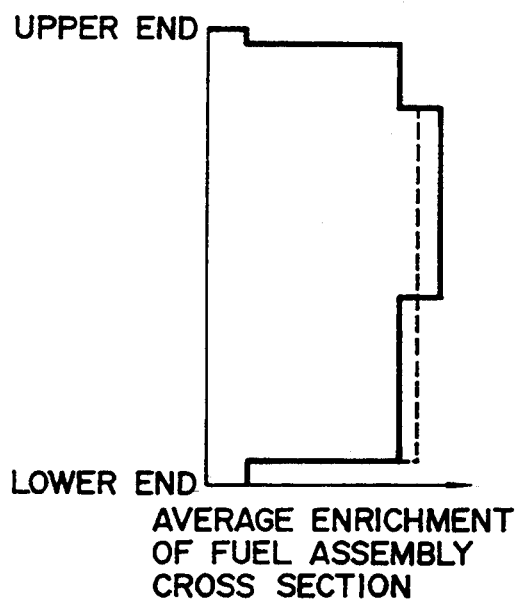
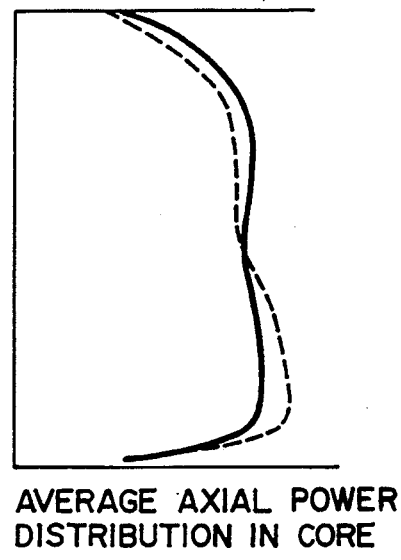
AVERAGE ENRICHMENT OF FUEL ASSEMBLY CROSS SECTION
AVERAGE AXIAL POWER DISTRIBUTION IN CORE
---- CASE IN WHICH ENRICHMENT DIFFERENCE DOES NOT RESIDE IN CENTRAL AND LOWER PORTIONS
—— CASE IN WHICH ENRICHMENT DIFFERENCE RESIDES IN CENTRAL AND LOWER PORTIONS
EFFECT BY PROVISION OF ENRICHMENT DIFFERENCE IN CENTRAL AND LOWER PORTIONS

| 1.34 | 1.23 | 1.35 | 1.35 | 1.27 | 1.32 | 1.30 | 1.25 |
|------|------|------|------|------|------|------|------|
|      | 1.17 | 0.49 | 0.87 | 0.46 | 1.22 | 0.48 | 1.31 |
|      |      | 1.16 | 0.47 | 1.24 | 1.04 | 1.12 | 1.05 |
|      |      |      |      |      | 1.20 | 0.44 | 0.96 |
|      |      |      |      |      | 0.45 | 1.07 | 0.95 |
|      |      |      |      |      | 1.01 | 0.43 | 0.97 |
|      |      |      |      |      |      | 1.20 | 1.08 |
|      |      |      |      |      |      |      | 1.18 |

FIG. 27

|      |      |      |      |      |      |      |      |      |
|------|------|------|------|------|------|------|------|------|
| 1.25 | 1.34 | 1.29 | 1.27 | 1.25 | 1.28 | 1.29 | 1.35 | 1.26 |
|      | 1.06 | 0.95 | 0.41 | 0.92 | 0.42 | 0.97 | 1.07 | 1.35 |
|      |      | 0.40 | 0.92 | 0.44 | 1.05 | 0.41 | 0.97 | 1.29 |
|      |      |      | 1.27 |      |      | 1.05 | 0.41 | 1.28 |
|      |      |      |      |      |      | 0.44 | 0.92 | 1.25 |
|      |      |      |      |      | 1.27 | 0.92 | 0.41 | 1.27 |
|      |      |      |      |      |      | 0.40 | 0.95 | 1.29 |
|      |      |      |      |      |      |      | 1.06 | 1.34 |
|      |      |      |      |      |      |      |      | 1.25 |

10

FIG. 31

FUEL ASSEMBLY OF NUCLEAR REACTOR

This application is a continuation of application Ser. No. 07/691,794, filed Apr. 26, 1991, abandoned Feb. 19, 1993.

BACKGROUND OF THE INVENTION

The present invention relates to a fuel assembly of a light water reactor, wherein the fuel assembly is charged with fuel rods in which a plutonium-uranium mixed fuel is packed.

It is possible to effectively utilize resource or improve fuel economy in a nuclear power plant by utilizing plutonium (Pu) obtained by reprocessing spent nuclear fuel in a light water reactor.

In a case where the plutonium is used as a fuel, since the nuclear characteristics of the plutonium fuel are different from those of the uranium fuel, the core and the core characteristics in case of using the plutonium fuel are also different from those in case of only using the uranium fuel. The main differences in the nuclear characteristics between the plutonium (Pu) and the uranium (U) reside in that (1) a thermal neutron absorption cross section of Pu-239 or Pu-241 of a fissile material of Pu is as large as twice that of U-235 of a fissile material of U and (2) a fissile material Pu-240 of Pu has a considerably large neutron absorption peak in a resonance region being an energy region in which the neutron is subjected to resonance absorption.

According to these facts, when Pu is charged in a reactor core, (1) neutron flux in a thermal region is decreased and the neutron flux in the resonance region or fast region is increased, that is, a neutron spectrum is hardened, and (2) on the basis of the increasing of the neutron absorption in the resonance region, the absolute value of the void coefficient (which is represented by a moderator temperature coefficient in a pressurized water reactor (PWR)) in a boiling water reactor (BWR), i.e., core reactivity change due to the change of the moderator density becomes large.

These facts affect the core characteristics in the following points manner.

(1) The core reactivity in a core cooling period is increased and the core shutdown margin is decreased. The reason why this is caused is represented by FIG. 14 as a mode.

(2) The core shutdown margin is decreased by the presence of a burnable poison such as gadolinium compound (gadolinia $Gd_2O_3$) or boron (B) or the decreasing of a reactivity controlling ability of control rods.

(3) Particularly, in case of BWR in which the moderator density is largely changed in the core axial direction, the distortion of the power distribution in the core axial direction is made large in comparison with a core in which only the uranium fuel is used and the thermal margin is decreased. This reason will be explained with reference to FIG. 15.

Since Pu is a radioactive material and also has a chemical toxicity as a heavy metal, the formation process of the U-Pu mixture is carried out in a glove box. For this reason, the usage of less of the kind of fuel rods of different Pu enrichments is economical for the formation working or process and is also desirable for the management or handling.

For conveyance of the U-Pu mixture fuel, called hereinlater MOX fuel, assembly, it is necessary to convey the same by accommodating it in a container provided with a specific radiation shielding for preventing the radiation emitted from the Pu and in the nuclear power plant, the MOX fuel assembly is managed under a specific control. In this meaning, it is desired to utilize smaller number of MOX fuel assemblies also in view of economy.

SUMMARY OF THE INVENTION

An object of the present invention is to substantially eliminate defects or drawbacks encountered in the prior art and to provide a fuel assembly of a nuclear reactor capable of improving core performance such as a thermal margin or shutdown margin of a core charged with fuel rods packed with uranium-plutonium mixture fuel and improving fuel economy in conveyance or handling of the same.

This and other objects can be achieved according to the present invention by providing, in one aspect, a fuel assembly of a nuclear reactor comprising:

a channel box; and a plurality of fuel rods arranged in the channel box, at least a part of the fuel rods being charged with a uranium-plutonium mixture fuel and an enrichment of U-235 or a concentration of plutonium, or both being distributed in an axial direction of the fuel rods.

In another aspect, there is provided a fuel assembly of a nuclear reactor comprising:

a channel box; and a plurality of fuel rods arranged in the channel box, at least a part of the fuel rods being charged with uranium-plutonium mixture fuel and at least a part of the fuel rods packed with a burnable poison having a concentration distributed in an axial direction of the fuel rods.

In a further aspect, there is provided a fuel assembly of a nuclear reactor comprising:

a plurality of channel boxes spaced by arranging control rods therebetween with spaces having widths such that a width of a space facing the control rod is wider than that not facing the control rod; and a plurality of fuel rods arranged in the respective channel boxes in a lattice type having n lines and n rows (n: natural number), the fuel rods including uranium fuel rods positioned to (1, 1), (1, 2), (2, 1), (1, n) and (n, 1) coordinate portions and other fuel rods, except fuel rods containing a burnable poison, packed with the uranium-plutonium mixture fuel, where a fuel rod positioned at a corner portion facing the control rod is designated as (1, 1) coordinate fuel rod and a fuel rod positioned at a corner portion diagonally opposing to the first mentioned corner portion is designated as (n, n) coordinate fuel rod.

In a still further aspect, there is provided a fuel assembly of a nuclear reactor comprising:

a plurality of channel boxes spaced by arranging control rods therebetween with spaces having widths such that a width of a space facing the control rod is wider than that not facing the control rod; and a plurality of fuel rods arranged in the respective channel boxes in a lattice type having n rows and n columns (n: natural number), the fuel rods including uranium fuel rods positioned to (1, 1), (1, n), (n, 1) and (n, n) coordinate portions and other fuel rods, except fuel rods containing a burnable poison, packed with the uranium-plutonium mixture fuel, where a fuel rod positioned at a corner portion facing the control rod is designated as (1, 1) coordinate fuel rod and a fuel rod positioned at a corner portion diagonally opposing to the first mentioned corner portion is designated as (n, n) coordinate fuel rod.

As described above, the characteristic features according to the present invention will be summarized as follows.

(1) Distribution of the concentrations of fissil material and the burnable poison of the fuel rods constituting the fuel assembly in the axial direction of the fuel rods;

(2) Increasing of the ratio of the region of the moderator of the fuel assembly with respect to the region of the fuel (called water-fuel ratio);

(3) Number of fuel rods containing the burnable poison with respect to one fuel assembly and the concentration of the burnable poison; and (4) Multi-usage of uranium to be mixed with plutonium.

The above factors will be described in detail hereunder, respectively, in relation to the present invention.

1. Axial Distribution of Fuel Assembly

The basic theory of the axial distribution of the uranium-plutonium (MOX) fuel assembly is first described.

In a view point of the core reactivity, the concentration of the fissile material (such as U-235, Pu-239, Pu-241) packed in the upper or lower or both ends of the fuel assembly is made small, but the concentration of the fissile material is made high at the central region of the fuel assembly, whereby the thermal neutron using ratio at the core central portion of high thermal neutron flux is enhanced as well as in the entire structure of the core.

In another view point of the improvement of the core shutdown margin, in a certain case, the concentration of the fissile material is made low at the upper region of the fuel assembly in comparison with the central region thereof. Since, in the light water reactor, the density of the moderator at the axially upper region of the core is high in comparison with that at the lower region, the accumulation of Pu is made high at the upper region of the core at which the burning progresses. Accordingly, the axial power distribution at the cooling period has an upper peak, and it is possible to preliminarily reduce the reactivity at the upper region of the core due to this characteristic feature, whereby the core reactivity at the cooling period is reduced and, hence, the core shutdown margin can be improved.

With reference to the BWR core particularly provided with large moderator density variation in the axial direction of the core, the reactivity is made high at the core lower region of high moderator density, axial output distribution is distored at the core lower region, and the thermal margin is made small. In order to solve this problem, according to the present invention, the concentration of the fissile material at the core lower region is made low, in a certain embodiment, in comparison with the central region of the fuel assembly, whereby the distortion of the power at the core lower region can be suppressed and the thermal margin can thus be made high.

The above described modes of distribution of the concentration of the fissile material in the axial direction of the fuel assembly can attain the independent functions and effects, respectively, so that it is not necessary to combine these modes totally according to the present invention. The conception of the distribution in the axial direction may be made in further detail in comparison with the mode of FIG. 16.

In view of the improvement of the reactivity of a core, the concentration of the burnable poison packed in the upper and lower regions of the fuel assembly can be made low or made zero in comparison with a case packed in the central region thereof. In a certain case, the concentration thereof at the upper region may be made low in comparison with the central region.

At the upper and lower ends of the core, in its nature, the burning of the burnable poison does not progress because of the low neutron flux. Accordingly, the amount (reactivity loss amount) of the unburned burnable poison which reduces the reactivity of the core at the end of the core operation cycle can be reduced by preliminarily reducing the concentration of the burnable poison in the upper and lower regions of the fuel assembly. Furthermore, because the density of the moderator in the axially upper region of the core is high in comparison with that in the lower region, the thermal neutron flux is low. Since the burnable poison used for the light water reactor is mainly composed of a thermal neutron absorbing material, the burning of the burnable poison hardly progresses at the axially upper region of the core. Accordingly, the reactivity loss amount due to the presence of the burnable poison can be reduced by preliminarily lowering the concentration of the burnable poison at the upper region of the fuel assembly.

Furthermore, there is a case wherein the concentration of the burnable poison in the lower region of the fuel assembly is made high in comparison with that in the central region for the purpose of increasing the thermal margin by suppressing the distortion of the power at the lower region of the core as described in (1) Fissile Material. In the other means, the fuel rods containing the burnable poison are increased in their numbers and these means may be utilized in combination thereof. These means are effective for lowering the reactivity in the lower region of the core and suppressing the distortion of the power therein.

Furthermore, there is a case wherein the fuel rods containing the burnable poison are increased in their numbers at the upper region of the fuel assembly for the purpose of improving the core shutdown margin described in (1) Fissile Material. According to this means, the core reactivity at the cooling period can be reduced, resulting in the improvement of the core shutdown margin. The concept of the axial distribution of the concentration of the burnable poison based on the above described technology is shown in FIG. 17.

2. Water-Fuel Ratio

In a conventional BWR, about two water rods are arranged per one fuel assembly so that non-boiled water passes the water rods. In a case where the MOX fuel is charged in the conventional fuel, for example, where 50% of the fuel rods in the assembly are substituted with the MOX fuel rods, the coefficient of density of moderator is made high by about 20%. This is because of the difference in the nuclear characteristics between the uranium and plutonium is as described before.

The difference in the reactivities in the power operation period and in the cooling period is made higher in proportion to the increasing of the absolute value of the moderator density coefficient. Since the effective multiplication factor of the core during the power operation period is near 1.0 (critical condition of core reactivity=0), the increasing of the absolute value of the moderator density coefficient causes the increasing of the core reactivity during the cooling period, thus reducing the core shutdown margin (refer to FIG. 14).

Furthermore, when the plutonium fuel is charged, the thermal neutron flux is lowered as described before, so that the effects of the burnable poison, being of a strong thermal neutron absorbing material, and the neutron absorbing material of the control rod are reduced and, hence, the thermal margin is also made small.

In order to solve these problems, it is considered to enlarge the substitution area of the water rod for the fuel rods in the fuel assembly and to pass the non-boiled water in the water rod. According to this means, the water-fuel ratio can be made large in comparison with the conventional fuel assembly and hence solve the problems. FIG. 18 represents an example of 8×8 lattice BWR core for showing the relationship between the number of the substituted fuel rods and the absolute value of the void reactivity coefficient.

According to the present invention, 6% of the cross-section the fuel rods based on the total cross-section of the fuel rods in a fuel assembly are replaced by a water rod or plural water rods, thereby reducing the absolute value of the void reactivity coefficient by about 20%, and in case of the fuel assembly in which the MOX fuel rods of about 50% are arranged as the fuel rods, the void reactivity coefficient can be made substantially equal to that obtained by the conventional fuel assembly in which only the uranium fuel is used, thereby ensuring an adequate core shutdown margin.

In the foregoing description, the examples of the BWR are mainly described, but the basic theory is substantially the same as that of the fuel assembly arranged in the PWR, in which the same effects will be attained by removing the fuel rods.

3. Amount of Burnable Poison

In the core in which the MOX fuel assembly is charged, in comparison with a core in which only the uranium fuel assembly is charged, the effect due to the burnable poison being a strong thermal neutron absorbing substance is made small and the burning speed of the burnable poison is hence made small due to the difference of the neutron spectrum. FIG. 19 shows the burning variation of the infinite multiplication factors of the MOX fuel assembly and the uranium fuel assembly both having the same numbers of the fuel rods containing the gadolinium compound with same gadolinium compound concentration. Referring to FIG. 19, the characters A and A' represent the effects in the negative reactivity of the gadolinium compound in the initial burning period, which are caused by capture of thermal neutrons in gadolinium and depend on the numbers of the fuel rods containing the gadolinium compound in a fuel assembly. The characters B and B' represent the duration times of the negative reactivity effects of the gadolinium compound which is related to the burning speed.

With respect to the MOX fuel assembly, the reactivity effect at the initial stage of the burning cycle is small and the duration time of the reactivity effects is long. This is caused by the fact that thermal neutron flux is lower in a MOX fuel assembly than in a uranium fuel assembly. Accordingly, the reactivities of the fuel assembly in the initial burning stage is made high in the case of using the fuel rods containing the gadolinium compound of the numbers same as those of the uranium fuel assembly and the adequate core shutdown margin may not be achieved in a certain case. In addition, there may cause a case where the output of the MOX fuel assembly is made high to thereby not ensure the thermal margin during the power running period of the core. On the other hand, in a case where the concentration of the gadolinium compound of the MOX fuel assembly is made equal to that of the uranium fuel assembly, unburned gadolinium compound remains, resulting in the reactivity loss and hence adverse fuel economy.

The present invention intends to obtain proper reactivity control with gadolinium compound for the MOX fuel assembly to obtain good performance of the core loaded with MOX fuel assembly. As described above, according to the present invention, with respect to the MOX fuel assembly, the fuel rods number of fuel rods containing the gadolinium compound is larger than that of the uranium fuel assembly and the of gadolinium compound is lower than that of the uranium fuel assembly in order to get almost the same multiplication factor of a uranium fuel assembly. The number of the gadolinium compound containing fuel rods and the concentration thereof depend on the reactivity of the MOX fuel assembly. In the present invention, the MOX fuel assembly is corresponding in terms of reactivity to the uranium fuel assembly with average U-235 enrichment of 3 to 4 wt %. In this case, the most suitable parameter relating to the fuel rods containing the gadolinium compound depends on the ratio of the number of the MOX fuel rods contained in the fuel assembly. FIG. 20A shows the relation of the ratio of the most suitable gadolinium compound containing fuel rods with respect to the number of the MOX fuel, and FIG. 20B shows the most suitable gadolinium compound concentration of the fuel rods containing the gadolinium compound. According to the present invention, the occupying ratio of the MOX fuel with respect to the total fuel in the fuel assembly is within 0.2 to 0.5, the ratio of the number of the fuel rods in which the gadolinium compound is axially contained by the amount of more than 80% is made to 0.15 to 0.23 with respect to the total fuel rods of the fuel assembly, and in a case where the ratio of the number of the MOX fuel rods is within 0.5 to 0.8, that of the fuel rods containing the gadolinium compound is within 0.2 to 0.25 and the concentration of the gadolinium compound is made to 1.5 to 4.0 wt %. The infinite multiplication factor in such case of the fuel assembly of the present invention is shown in FIG. 21. Accordingly, as shown in FIG. 21, the reactivity characteristics of the fuel containing MOX can be made substantially equal to those of the uranium fuel, thus ensuring an adequate core shutdown margin and thermal margin.

4. Multi-usage of Uranium mixed with Plutonium

MOX fuel includes a few wt % of plutonium oxide and the rest of that is uranium oxide. Uranium to be mixed with plutonium in the MOX fuel is usually natural uranium. However, according to the present invention, in order to save the amount of the natural uranium in the MOX fuel, depleted uranium having U-235 enrichment of 0.2 to 0.3 wt % or recycled uranium obtained by reprocessing the spent fuel can be used. In other cases, natural uranium in combination with these other uraniums may be used. Therefore, the amount of natural uranium in the MOX fuel can be lessened and the cost of the MOX fuel is reduced.

Some part of FP (Fission Product) gas, which is FP with gas form, is released from surface of a fuel pellet with burn up of fuel so that it raises the inner pressure of the fuel rod. Since the FP gas release ratio of the MOX fuel rod is higher than that of the uranium fuel rod, the inner pressure of the fuel rod may become high. In this view point, according to one aspect of the present invention, the length of the plenum portion (portion in which no fuel pellet is packed in the fuel rod) of the MOX fuel rod is made longer than the uranium fuel rod, whereby the inner pressure of the MOX fuel rod may be made equal to that of the uranium fuel rod. For example, the plenum may have a length which exceeds the length of the uranium fuel rod by a maximum 15 cm.

Furthermore, in a fuel assembly in which plurality of fuel rods arranged in the respective channel boxes in a lattice shape having n row and n column (n: natural number) and the space between the respective channel boxes is made wide on the side facing the control rod in comparison with that of the side not facing the control rod, according to the present invention, the fuel rods including uranium fuel rods positioned to (1, 1), (1, 2), (2, 1), (1, n) and (n, 1) coordinate portions and the MOX fuel rods, except fuel rods containing a burnable poison, where a fuel rod positioned at a corner portion facing the control rod is designated as (1, 1) coordinate fuel rod and a fuel rod positioned at a corner portion diagonally opposing to the first mentioned corner portion is designated as (n, n) coordinate fuel rod. In another aspect of the fuel assembly of the present invention in which the spaces between the respective channel boxes are made equal on both the sides facing and not facing the control rod, the fuel rods including the uranium fuel rods positioned to (1, 1), (1, n), (n, 1) and (n, n) coordinate portions and the MOX fuel rods, except fuel rods containing a burnable poison, where a fuel rod positioned at a corner portion facing the control rod is designated as (1, 1) coordinate fuel rod and a fuel rod positioned at a corner portion diagonally opposing to the first mentioned corner portion is designated as (n, n) coordinate fuel rod.

According to such arrangement, the amount of plutonium is largely reduced and the kind of the Pu enrichment is reduced, so that the MOX fuel rod can easily be manufactured, thus improving the fuel economy and easily handling the fuel rods.

BRIEF DESCRIPTION OF THE DRAWINGS

For a better understanding of the present invention and to show how the same is carried out, reference is made, by way of preferred embodiments, to the accompanying drawings, in which:

FIGS. 23A and 23B are views is a view describing the provision of the difference in the enrichment in the central portion and the lower portion of the fuel assembly;

FIG. 27 is a view representing the relative power distribution of the respective fuel rods of the fuel assembly of FIG. 25;

FIG. 31 is a view representing the relative power distribution of the respective fuel rods of the fuel assembly of FIG. 29.

DESCRIPTION OF THE PREFERRED EMBODIMENTS

Preferred embodiments of a fuel assembly according to the present invention will be described with reference to the accompanying drawings.

Figure 1:
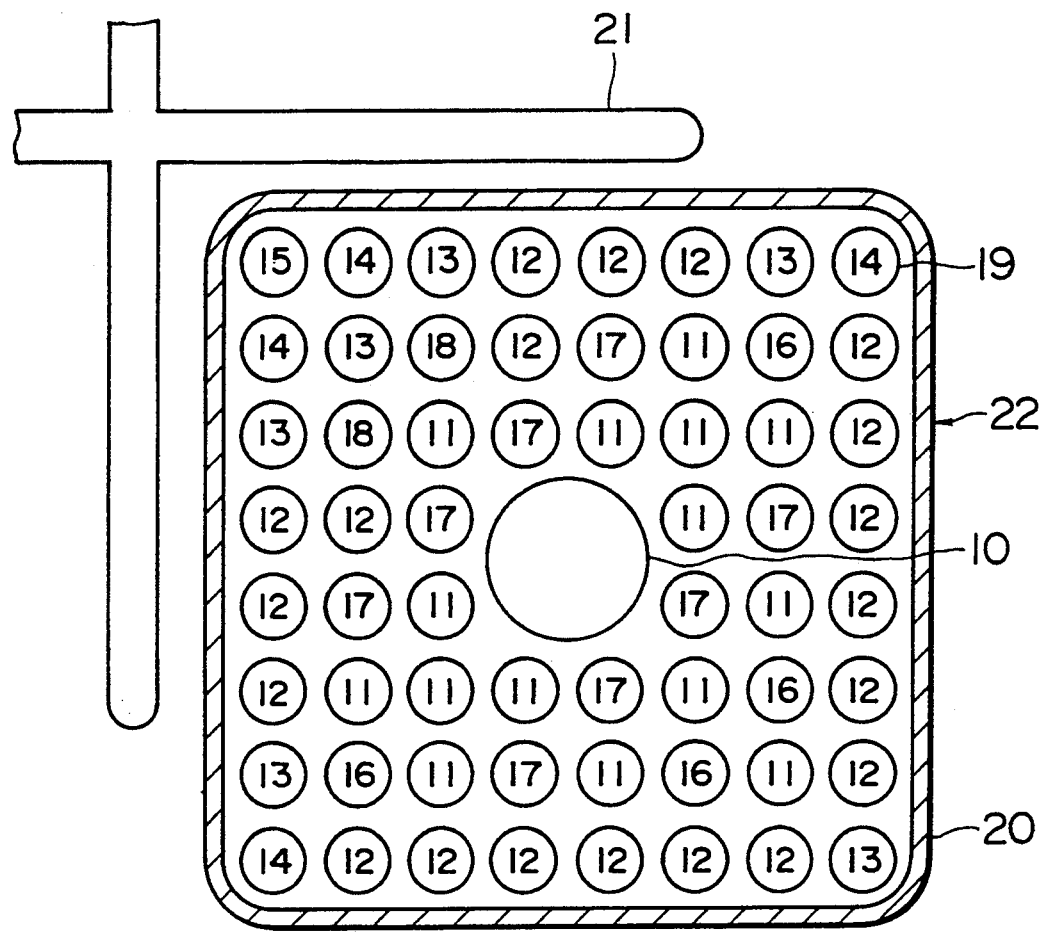
FIG. 1 is a sectional view of a fuel assembly applicable to a BWR of one embodiment according to the present invention.
Figure 2:
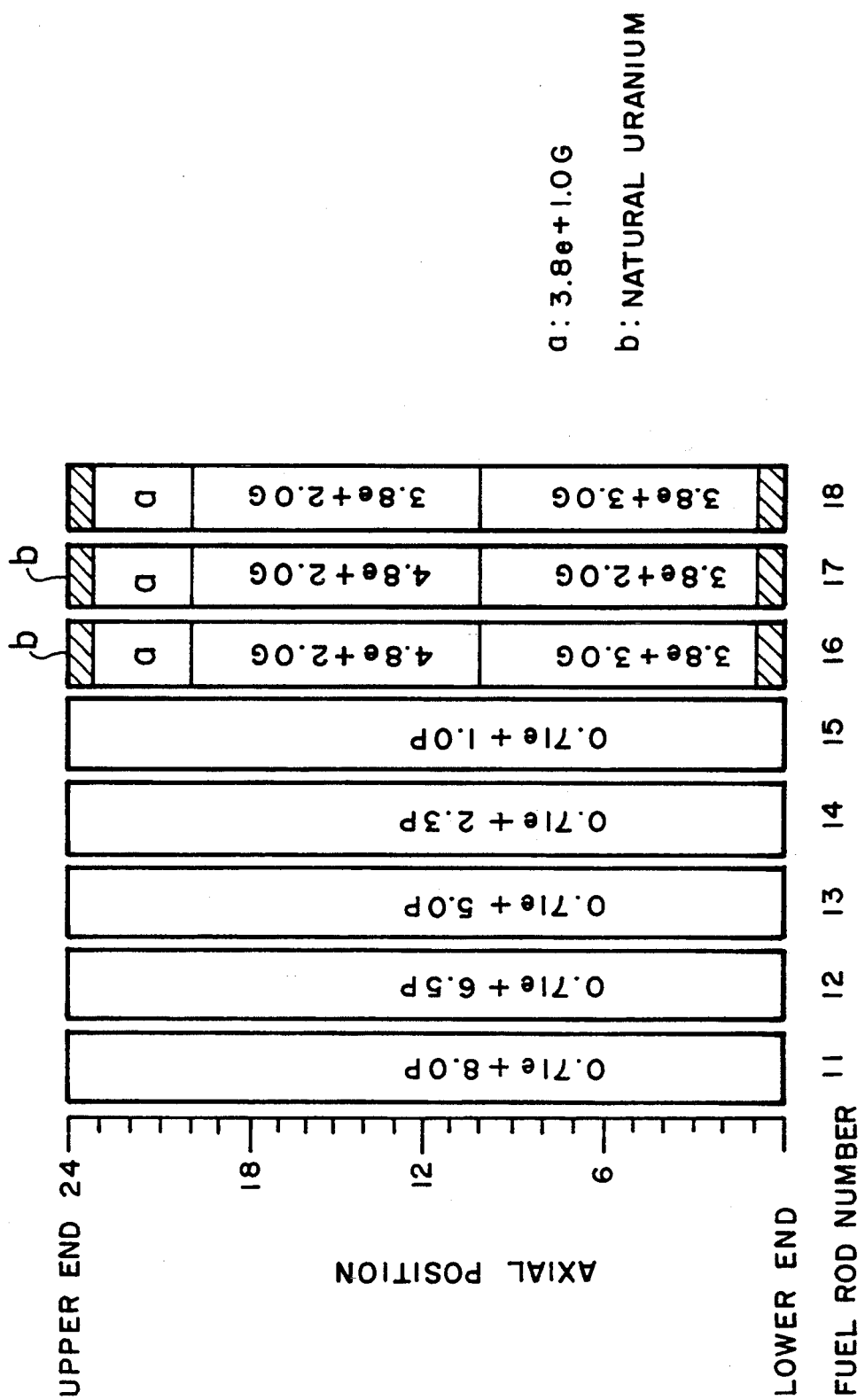
FIG. 2 is a view showing the relationship between fuel enrichment, concentration of plutonium and distribution of gadolinium compound of fuel rods constituting the fuel assembly of FIG. 1.

First, FIGS. 1 and 2 represent a fuel assembly 22 of one embodiment of the type including replaceable fuel rods for a BWR core and the fuel assembly 22 comprises fuel rods 19, channel box 20, water rod 10, lower tie rod, upper tie rod and spacers. The upper and lower ends of the fuel rods 19 and the water rod 10 are supported by the upper and lower tie rods, both not shown, respectively. A plurality of spacers, not shown, are disposed along the axial direction of the fuel rods 19 thereby to suitably maintain gaps between the fuel rods 19 and the water rod 10. The channel box 20 is secured to the upper tie plate so as to surround the outer periphery of a bundle of the fuel rods 19 supported by the spacers. A channel fastener is secured to the upper tie plate. In FIG. 1, reference numeral 21 denotes a control rod to be arranged in the core.

Each of the fuel rods 19 is prepared by charging a plurality of fuel pellets into a clad having both ends sealed by upper and lower plugs, not shown. Each of the fuel pellets is prepared by sintering an oxide of a fuel material and therefore includes a fissile material, and the fuel pellet is urged downwards by a spring member disposed in a gas plenum formed in the clad.

The water rod 10 is also formed with the same clad as that of the fuel rod 19, but fuel material is not charged therein and provided with holes, at the side surfaces of the upper and lower end portions thereof, for passing a coolant not boiled into the clad.

Usually, in the BWR core, the control rods 21 are inserted in cross shape with respect to four bundles of the fuel assemblies as shown in FIG. 1. This BWR core includes a D lattice core in which one water gap is formed on the side of the fuel assembly facing the control rods 21 so as to have a gap width larger than that of another water gap (not shown) formed on the side of the fuel assembly not facing the control rod 21 and a C lattice core in which one water gap is formed on the side of the fuel assembly facing the control rods 21 so as to have a gap width equal to that of another water gap (not shown) formed on the side of the fuel assembly not facing the control rod 21.

The fuel assembly 22 of the present embodiment is a fuel assembly to be charged in the D lattice core (not shown). The fuel rods 19 constituting the fuel assembly 18 includes eight kinds of fuel rods 11 to 18 as shown in FIG. 2 and Table 1 and these kinds of fuel rods 11 to 18 are arranged in the channel box 20 as shown in FIG. 1. The lower ends in FIG. 2 and Table 1, show a fuel material packed region (called fuel effective portion or region, hereinlater) in the fuel rod and the lower and upper ends each has 24/24 length region of the effective portion of the fuel rod.

TABLE 1

| AXIAL POSITION (FROM LOWER END) | $0 \sim \frac{1}{24}$ | $\frac{1}{24} \sim \frac{10}{24}$ | $\frac{10}{24} \sim \frac{20}{24}$ | $\frac{20}{24} \sim \frac{23}{24}$ | $\frac{23}{24} \sim \frac{24}{24}$ |
|---|---|---|---|---|---|
| FUEL NUMBER | | | | | |
| 11 | | | 0.71 / 8.0 / 0.0 | | |
| 12 | | | 0.71 / 6.5 / 0.0 | | |
| 13 | | | 0.71 / 5.0 / 0.0 | | |
| 14 | | | 0.71 / 2.3 / 0.0 | | |
| 15 | | | 0.71 / 1.0 / 0.0 | | |
| 16 | 0.71 / 0.0 / 0.0 | 3.8 / 0.0 / 3.0 | 4.8 / 0.0 / 2.0 | 3.8 / 0.0 / 1.0 | 0.71 / 0.0 / 0.0 |
| 17 | 0.71 / 0.0 / 0.0 | 3.8 / 0.0 / 2.0 | 4.8 / 0.0 / 2.0 | 3.8 / 0.0 / 1.0 | 0.71 / 0.0 / 0.0 |
| 18 | 0.71 / 0.0 / 0.0 | 3.8 / 0.0 / 3.0 | 3.8 / 0.0 / 2.0 | 3.8 / 0.0 / 1.0 | 0.71 / 0.0 / 0.0 |

UPPER STAGE: U-235 ENRICHMENT (wt %)
INTERMEDIATE STAGE: PLUTONIUM WEIGHT %
LOWER STAGE: BURNABLE POISON $Gd_2O_3$ WEIGHT %
U-235 ENRICHMENT OF 0.71 wt % MEANS NATURAL URANIUM

The fuel rods 11 to 15 are MOX fuel rods. The fuel rod 11 comprises a mixture of natural uranium (U-235 of 0.71 wt %) and plutonium (Pu) of 8.0 wt %. The fuel rods 12, 13, 14 and 15 also comprise mixtures of natural uranium and plutonium of 6.5 wt %, 5.0 wt %, 2.3 wt % and 1.0 wt %, respectively.

The fuel rods 16, 17 and 18 are fuel rods containing the burnable poison and the upper and lower ends of these fuel rods are packed with natural uranium, the upper and lower ends each having a length of 1/24 region of the length of the fuel effective portion (hereinlater called merely 1/24 region or portion).

Regarding the fuel rod 16, a fuel prepared by a mixture of uranium having U-235 with an enrichment of 3.8 wt % and gadolinium compound of 3.0 wt % is packed in a region extending between 1/24 to 10/24 region of the fuel effective portion (called lower portion hereinlater). A fuel prepared by a mixture of uranium having U-235 with an enrichment of 4.8 wt % and gadolinium compound of 2.0 wt % is packed in a region extending between 10/24 to 20/24 region of the fuel effective portion (called central portion hereinafter) and a fuel prepared by a mixture of uranium having U-235 with an enrichment of 3.8 wt % and gadolinium compound of 1.0 wt % is packed in a region extending between 20/24 to 23/24 region of the fuel effective portion (called upper portion hereinlater).

In like manner, regarding the fuel rod 17, a fuel prepared by a mixture of uranium having U-235 with an enrichment of 3.8 wt % and gadolinium compound of 2.0 wt % is packed in the lower portion. A fuel prepared by a mixture of uranium having U-235 with an enrichment of 4.8 wt % and gadolinium compound of 2.0 wt % is packed in the central portion, and a fuel prepared by a mixture of uranium having U-235 with an enrichment of 3.9 wt % and gadolinium compound of 1.0 wt % is packed in the upper portion. Furthermore, regarding the fuel rod 18, a fuel prepared by a mixture of uranium having U-235 with an enrichment of 3.8 wt % and gadolinium compound of 3.0 wt % is packed in the lower portion. A fuel prepared by a mixture of uranium having U-235 with enrichment of 3.8 wt % and gadolinium compound of 2.0 wt % is packed in the central portion, and a fuel prepared by a mixture of uranium having U-235 with enrichment of 3.8 wt % and gadolinium compound of 1.0 wt % is packed in the upper portion.

According to this embodiment, as shown in FIG. 1, a water rod having a cross sectional area corresponding to that of four fuel rods are arranged in the central portion of the fuel assembly. The reason why the natural uranium is packed in the region having the upper and lower length of 1/24 region resides in the improvement of the effective usage of the thermal neutron in the whole structure of the core.

In this embodiment, the MOX fuel rods of the fuel rods 11 to 15 having no axial distribution are selected in a view point of manufacturing cost, but as shown in Table 2, there may be considered a case wherein the upper and lower ends of the MOX fuel rods consist only of the natural uranium including no mixture of plutonium and the amount of the plutonium in 1/24 to 3/24 length region of the fuel rod is increased by the amount corresponding to that removed in the upper and lower regions. According to this modified example, the amount of the plutonium contained in that region is increased by about 10%, resulting in the improvement of the effective usage of the thermal neutron.

TABLE 2

| AXIAL POSITION (FROM LOWER END) | $0 \sim \frac{1}{24}$ | $\frac{1}{24} \sim \frac{10}{24}$ | $\frac{10}{24} \sim \frac{20}{24}$ | $\frac{20}{24} \sim \frac{23}{24}$ | $\frac{23}{24} \sim \frac{24}{24}$ |
|---|---|---|---|---|---|
| FUEL NUMBER | | | | | |
| 11 | 0.71 | | 0.71 | | 0.71 |
|  | 0.0 | | 8.8 | | 0.0 |
|  | 0.0 | | 0.0 | | 0.0 |
| 12 | 0.71 | | 0.71 | | 0.71 |
|  | 0.0 | | 8.8 | | 0.0 |
|  | 0.0 | | 0.0 | | 0.0 |
| 13 | 0.71 | | 0.71 | | 0.71 |
|  | 0.0 | | 5.5 | | 0.0 |
|  | 0.0 | | 0.0 | | 0.0 |
| 14 | 0.71 | | 0.71 | | 0.71 |
|  | 0.0 | | 2.5 | | 0.0 |
|  | 0.0 | | 0.0 | | 0.0 |
| 15 | 0.71 | | 0.71 | | 0.71 |
|  | 0.0 | | 1.1 | | 0.0 |
|  | 0.0 | | 0.0 | | 0.0 |
| 16 | 0.71 | 3.8 | 4.8 | 3.8 | 0.71 |
|  | 0.0 | 0.0 | 0.0 | 0.0 | 0.0 |
|  | 0.0 | 3.0 | 2.0 | 1.0 | 0.0 |
| 17 | 0.71 | 3.8 | 4.8 | 3.8 | 0.71 |
|  | 0.0 | 0.0 | 0.0 | 0.0 | 0.0 |
|  | 0.0 | 2.0 | 2.0 | 1.0 | 0.0 |
| 18 | 0.71 | 3.8 | 3.8 | 3.8 | 0.71 |
|  | 0.0 | 0.0 | 0.0 | 0.0 | 0.0 |
|  | 0.0 | 3.0 | 2.0 | 1.0 | 0.0 |

UPPER STAGE: U-235 ENRICHMENT (wt %)
INTERMEDIATE STAGE: PLUTONIUM WEIGHT %
LOWER STAGE: BURNABLE POISON $Gd_2O_3$ WEIGHT %
U-235 ENRICHMENT OF 0.71 wt % MEANS NATURAL URANIUM

In these embodiments, the lengths of upper and lower regions, blanket portions hereinlater, in which the concentration of the fissile material is lowered are determined to have 1/24 nodes, respectively, but these lengths may be increased or decreased. In case of increasing the length of the blanket portion, the concentration of the fissile material charged in the central portion of the fuel assembly is increased and the output peaking in the axial direction is made high at the central portion, thus making small the thermal margin. Accordingly, it is necessary to determine the length of the blanket portion in relation to the thermal margin, but in a case where the thermal margin is large as a core, the length of the upper blanket portion may be made to 1/24 of the length of the effective portion.

Figure 22:
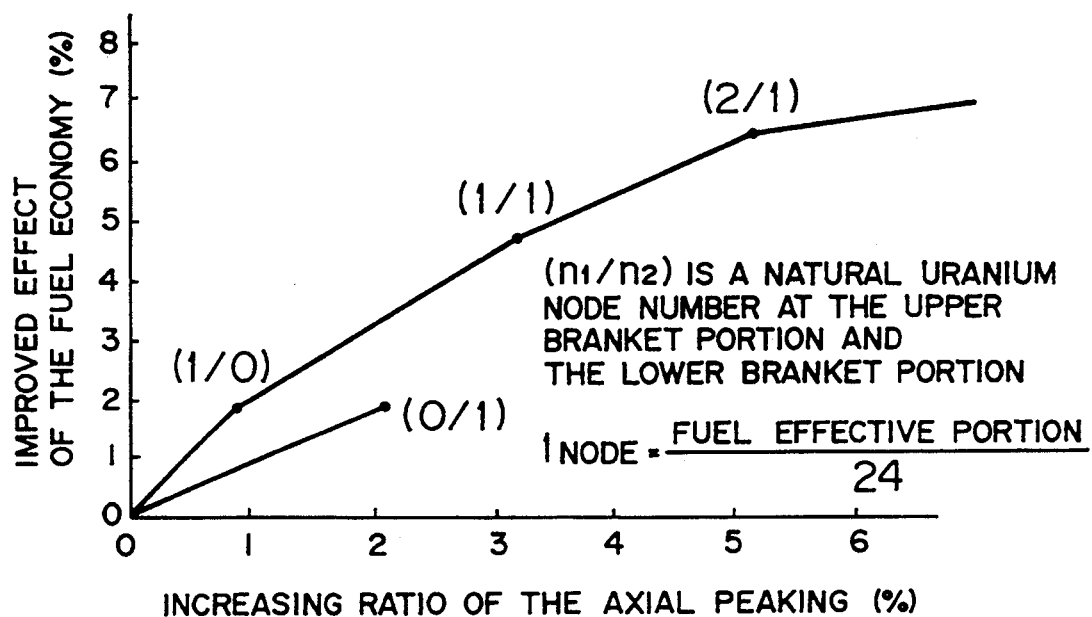
FIG. 22 is a view showing the characteristics of the increasing ratio of the power peak with respect to the axial length of the natural uranium blanket portion and the improved effect of the fuel economy.

As shown in FIG. 22, the core reactivity is improved by increasing the upper and lower natural uranium blanket regions and, hence, the fuel economy is also improved. However, the axial peaking is increased and the thermal margin is decreased. The degree of the improvement of the fuel economy with respect to the axial peaking increasing is made small as the blanket region is increased. In case of the BWR core which is more standard than this type core, it may be preferred that the upper blanket portion has a length of about 1/24 to 2/24 of the effective portion and the lower blanket portion has a length of about 1/24 of the effective portion in relation to the thermal margin.

Figure 3:
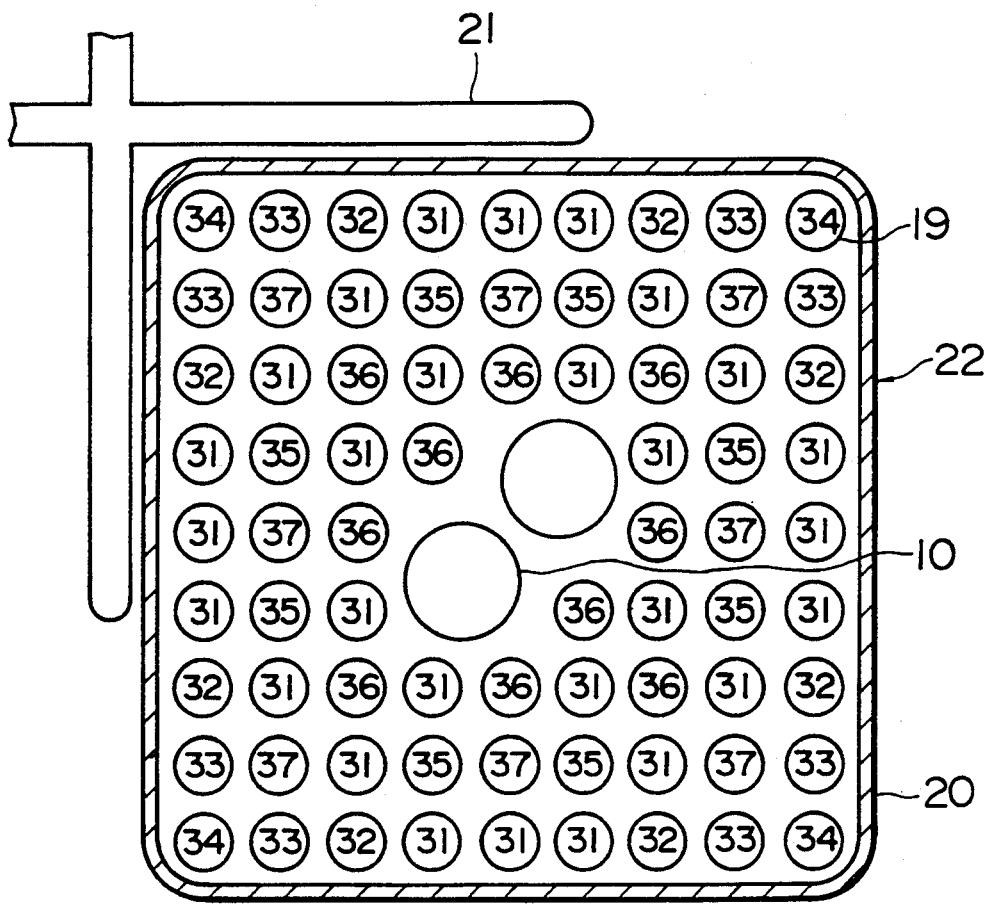
FIG. 3 is a sectional view of a fuel assembly of another embodiment of the present invention.
Figure 4:
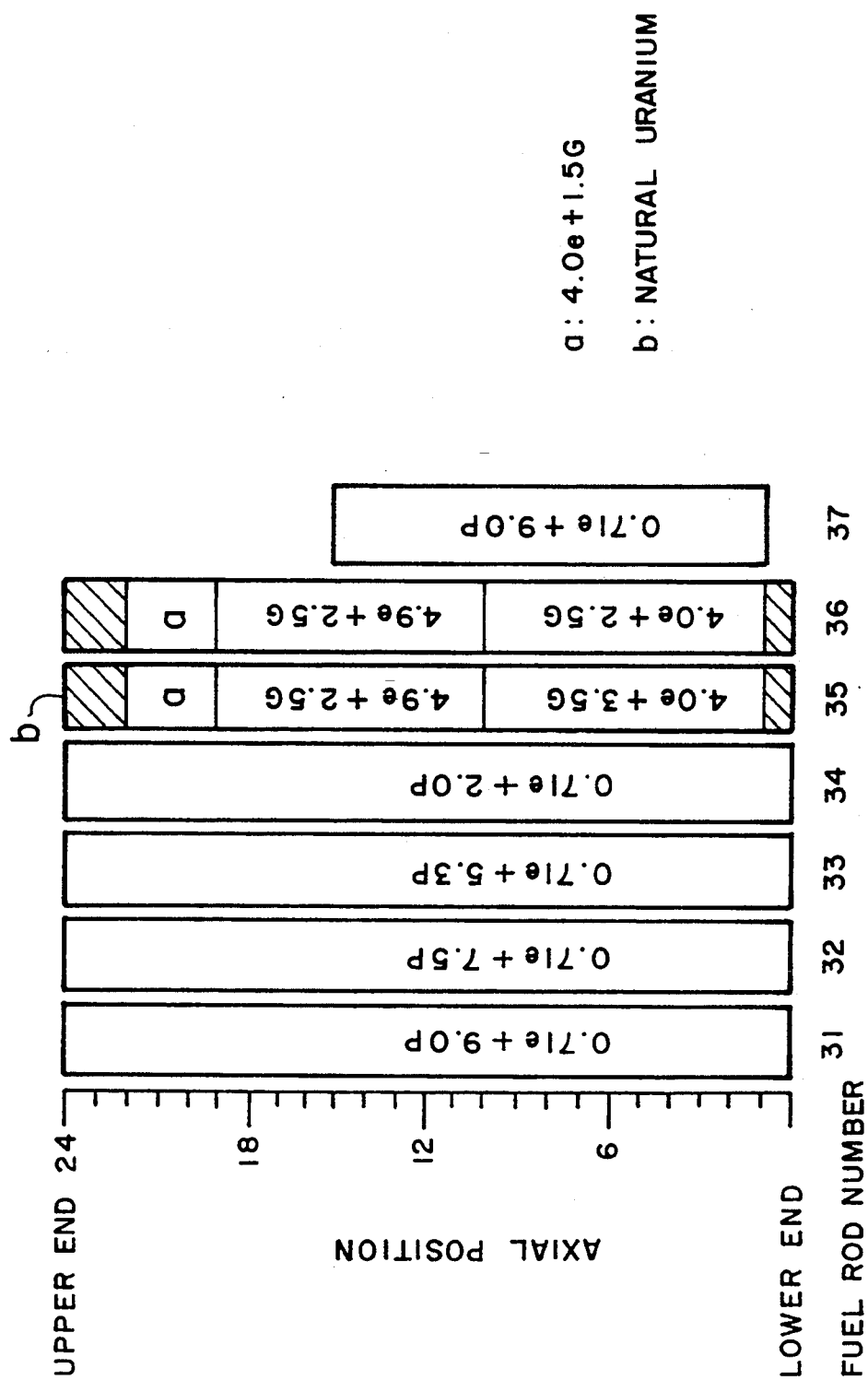
FIG. 4 is a view showing the relationship between fuel enrichment, concentration of plutonium and distribution of gadolinium compound of fuel rods constituting the fuel assembly of FIG. 3.

FIGS. 3 and 4 and Tables 3 and 4 represent a modified example in which the upper portion of the fuel rod has a blanket length of 2/24 of the effective portion.

and the fuel rods 31 to 34 and 37 are the MOX fuel rods. The fuel rod 37 is of a kind having a short fuel effective portion different from the other fuel rods. The fuel rods 35 and 36 are of a kind in which the burnable poison is mixed.

It may be considered that the blanket portions are composed of a reprocessed-recycled uranium or depleted uranium other than the natural uranium. Such embodiments will be represented by Tables 5 and 6 as modified ones of those represented by FIGS. 1 and 2 and the Table 1, and the arrangement of the fuel is substantially equal to that of FIG. 1. The effects of the

TABLE 3

| AXIAL POSITION (FROM LOWER END) | $0 \sim \frac{1}{24}$ | $\frac{1}{24} \sim \frac{10}{24}$ | $\frac{10}{24} \sim \frac{19}{24}$ | $\frac{19}{24} \sim \frac{22}{24}$ | $\frac{22}{24} \sim \frac{24}{24}$ |
|---|---|---|---|---|---|
| FUEL NUMBER | | | | | |
| 11 | 0.71 | | 0.71 | | 0.71 |
|    | 0.0  | | 8.7  | | 0.0  |
|    | 0.0  | | 0.0  | | 0.0  |
| 12 | 0.71 | | 0.71 | | 0.71 |
|    | 0.0  | | 7.1  | | 0.0  |
|    | 0.0  | | 0.0  | | 0.0  |
| 13 | 0.71 | | 0.71 | | 0.71 |
|    | 0.0  | | 5.5  | | 0.0  |
|    | 0.0  | | 0.0  | | 0.0  |
| 14 | 0.71 | | 0.71 | | 0.71 |
|    | 0.0  | | 2.5  | | 0.0  |
|    | 0.0  | | 0.0  | | 0.0  |
| 15 | 0.71 | | 0.71 | | 0.71 |
|    | 0.0  | | 1.1  | | 0.0  |
|    | 0.0  | | 0.0  | | 0.0  |
| 16 | 0.71 | 3.8 | 4.8 | 3.8 | 0.71 |
|    | 0.0  | 0.0 | 0.0 | 0.0 | 0.0  |
|    | 0.0  | 3.0 | 2.0 | 1.0 | 0.0  |
| 17 | 0.71 | 3.8 | 4.8 | 3.8 | 0.71 |
|    | 0.0  | 0.0 | 0.0 | 0.0 | 0.0  |
|    | 0.0  | 2.0 | 2.0 | 1.0 | 0.0  |
| 18 | 0.71 | 3.8 | 3.8 | 3.8 | 0.71 |
|    | 0.0  | 0.0 | 0.0 | 0.0 | 0.0  |
|    | 0.0  | 3.0 | 2.0 | 1.0 | 0.0  |

UPPER STAGE: U-235 ENRICHMENT (wt %)
INTERMEDIATE STAGE: PLUTONIUM WEIGHT %
LOWER STAGE: BURNABLE POISON $Gd_2O_3$ WEIGHT %
·U-235 ENRICHMENT OF 0.71 wt % MEANS NATURAL URANIUM

TABLE 4

| AXIAL POSITION (FROM LOWER END) | $0 \sim \frac{1}{24}$ | $\frac{1}{24} \sim \frac{10}{24}$ | $\frac{10}{24} \sim \frac{15}{24}$ | $\frac{15}{24} \sim \frac{19}{24}$ | $\frac{19}{24} \sim \frac{22}{24}$ | $\frac{22}{24} \sim \frac{24}{24}$ |
|---|---|---|---|---|---|---|
| FUEL NUMBER | | | | | | |
| 31 | | | | 0.71 | | |
|    | | | | 9.0  | | |
|    | | | | 0.0  | | |
| 32 | | | | 0.71 | | |
|    | | | | 7.5  | | |
|    | | | | 0.0  | | |
| 33 | | | | 0.71 | | |
|    | | | | 5.3  | | |
|    | | | | 0.0  | | |
| 34 | | | | 0.71 | | |
|    | | | | 2.0  | | |
|    | | | | 0.0  | | |
| 35 | 0.71 | 4.0 | | 4.9 | 4.0 | 0.71 |
|    | 0.0  | 0.0 | | 0.0 | 0.0 | 0.0  |
|    | 0.0  | 3.5 | | 2.5 | 1.5 | 0.0  |
| 36 | 0.71 | 4.0 | | 4.9 | 4.0 | 0.71 |
|    | 0.0  | 0.0 | | 0.0 | 0.0 | 0.0  |
|    | 0.0  | 2.5 | | 2.5 | 1.5 | 0.0  |
| 37 | — | | 0.71 | | — | |
|    |   | | 9.0  | | | |

UPPER STAGE: U-235 ENRICHMENT (wt %)
INTERMEDIATE STAGE: PLUTONIUM WEIGHT %
LOWER STAGE: BURNABLE POISON $Gd_2O_3$ WEIGHT %
·U-235 ENRICHMENT OF 0.71 wt % MEANS NATURAL URANIUM

The fuel assembly 22 of this embodiment is of the type capable of being charged into the C lattice core location of the blanket portions in these embodiments are substantially the same as those attained by the fuel rod packed with the natural uranium.

20/24). This is performed for the purpose of increasing the core shutdown margin, but in order to further improve this effect, it may be considered to further reduce

TABLE 5

| AXIAL POSITION (FROM LOWER END) | 0 ~ 1/24 | 1/24 ~ 10/24 | 10/24 ~ 20/24 | 20/24 ~ 23/24 | 23/24 ~ 24/24 |
|---|---|---|---|---|---|
| FUEL NUMBER | | | | | |
| 11 | | | 0.71<br>8.0<br>0.0 | | |
| 12 | | | 0.71<br>6.5<br>0.0 | | |
| 13 | | | 0.71<br>5.0<br>0.0 | | |
| 14 | | | 0.71<br>2.3<br>0.0 | | |
| 15 | | | 0.71<br>1.0<br>0.0 | | |
| 16 | 0.90<br>0.0<br>0.0 | 3.6<br>0.0<br>3.0 | 4.6<br>0.0<br>2.0 | 3.6<br>0.0<br>1.0 | 0.90<br>0.0<br>0.0 |
| 17 | 0.90<br>0.0<br>0.0 | 3.6<br>0.0<br>2.0 | 4.6<br>0.0<br>2.0 | 3.6<br>0.0<br>1.0 | 0.90<br>0.0<br>0.0 |
| 18 | 0.90<br>0.0<br>0.0 | 3.6<br>0.0<br>3.0 | 3.6<br>0.0<br>2.0 | 3.6<br>0.0<br>1.0 | 0.90<br>0.0<br>0.0 |

UPPER STAGE: U-235 ENRICHMENT (wt %)
INTERMEDIATE STAGE: PLUTONIUM WEIGHT %
LOWER STAGE: BURNABLE POISON $Gd_2O_3$ WEIGHT %
·U-235 ENRICHMENT OF 0.71 wt % MEANS NATURAL URANIUM
·U-235 ENRICHMENT OF 0.90 wt % MEANS REPROCESSED-RECYCLED URANIUM

TABLE 6

| AXIAL POSITION (FROM LOWER END) | 0 ~ 1/24 | 1/24 ~ 10/24 | 10/24 ~ 20/24 | 20/24 ~ 23/24 | 23/24 ~ 24/24 |
|---|---|---|---|---|---|
| FUEL NUMBER | | | | | |
| 11 | | | 0.71<br>8.0<br>0.0 | | |
| 12 | | | 0.71<br>6.5<br>0.0 | | |
| 13 | | | 0.71<br>5.0<br>0.0 | | |
| 14 | | | 0.71<br>2.3<br>0.0 | | |
| 15 | | | 0.71<br>1.0<br>0.0 | | |
| 16 | 0.25<br>0.0<br>0.0 | 4.2<br>0.0<br>3.0 | 5.2<br>0.0<br>2.0 | 4.2<br>0.0<br>1.0 | 0.25<br>0.0<br>0.0 |
| 17 | 0.25<br>0.0<br>0.0 | 4.2<br>0.0<br>2.0 | 5.2<br>0.0<br>2.0 | 4.2<br>0.0<br>1.0 | 0.25<br>0.0<br>0.0 |
| 18 | 0.25<br>0.0<br>0.0 | 4.2<br>0.0<br>3.0 | 4.2<br>0.0<br>2.0 | 4.2<br>0.0<br>1.0 | 0.25<br>0.0<br>0.0 |

UPPER STAGE: U-235 ENRICHMENT (wt %)
INTERMEDIATE STAGE: PLUTONIUM WEIGHT %
LOWER STAGE: BURNABLE POISON $Gd_2O_3$ WEIGHT %
·U-235 ENRICHMENT OF 0.71 wt % MEANS NATURAL URANIUM
·U-235 ENRICHMENT OF 0.25 wt % MEANS DEPLETED URANIUM

In the foregoing embodiments, the enrichment of the uranium fuel of regions (20/24 to 23/24) below the upper blanket portions of the fuel rods 16, 17 and 18 is made to 3.8 wt % which is the same of the regions of 1/24 to 10/24 below the central portion (10/24 to 20/24). This is performed for the purpose of increasing the core shutdown margin, but in order to further improve this effect, it may be considered to further reduce the enrichment of these regions or to elongate the lengths of these regions. This embodiment is represented by the following Tables 7 and 8, in which the arrangement of the fuel rods is substantially equal to that shown in FIG. 1.

TABLE 7

| AXIAL POSITION (FROM LOWER END) | $0 \sim \frac{1}{24}$ | $\frac{1}{24} \sim \frac{10}{24}$ | $\frac{10}{24} \sim \frac{20}{24}$ | $\frac{20}{24} \sim \frac{23}{24}$ | $\frac{23}{24} \sim \frac{24}{24}$ |
|---|---|---|---|---|---|
| FUEL NUMBER | | | | | |
| 11 | | | 0.71 | | |
| | | | 8.0 | | |
| | | | 0.0 | | |
| 12 | | | 0.71 | | |
| | | | 6.5 | | |
| | | | 0.0 | | |
| 13 | | | 0.71 | | |
| | | | 5.0 | | |
| | | | 0.0 | | |
| 14 | | | 0.71 | | |
| | | | 2.3 | | |
| | | | 0.0 | | |
| 15 | | | 0.71 | | |
| | | | 1.0 | | |
| | | | 0.0 | | |
| 16 | 0.71 | 4.1 | 5.1 | 3.6 | 0.71 |
| | 0.0 | 0.0 | 0.0 | 0.0 | 0.0 |
| | 0.0 | 3.0 | 2.0 | 1.0 | 0.0 |
| 17 | 0.71 | 4.1 | 5.1 | 3.6 | 0.71 |
| | 0.0 | 0.0 | 0.0 | 0.0 | 0.0 |
| | 0.0 | 2.0 | 2.0 | 1.0 | 0.0 |
| 18 | 0.71 | 4.1 | 4.8 | 3.6 | 0.71 |
| | 0.0 | 0.0 | 0.0 | 0.0 | 0.0 |
| | 0.0 | 3.0 | 2.0 | 1.0 | 0.0 |

UPPER STAGE: U-235 ENRICHMENT (wt %)
INTERMEDIATE STAGE: PLUTONIUM WEIGHT %
LOWER STAGE: BURNABLE POISON $Gd_2O_3$ WEIGHT %
U-235 ENRICHMENT OF 0.71 wt % MEANS NATURAL URANIUM

TABLE 8

| AXIAL POSITION (FROM LOWER END) | $0 \sim \frac{1}{24}$ | $\frac{1}{24} \sim \frac{10}{24}$ | $\frac{10}{24} \sim \frac{19}{24}$ | $\frac{19}{24} \sim \frac{23}{24}$ | $\frac{23}{24} \sim \frac{24}{24}$ |
|---|---|---|---|---|---|
| FUEL NUMBER | | | | | |
| 11 | | | 0.71 | | |
| | | | 8.0 | | |
| | | | 0.0 | | |
| 12 | | | 0.71 | | |
| | | | 6.5 | | |
| | | | 0.0 | | |
| 13 | | | 0.71 | | |
| | | | 5.0 | | |
| | | | 0.0 | | |
| 14 | | | 0.71 | | |
| | | | 2.3 | | |
| | | | 0.0 | | |
| 15 | | | 0.71 | | |
| | | | 1.0 | | |
| | | | 0.0 | | |
| 16 | 0.71 | 3.8 | 4.8 | 3.8 | 0.71 |
| | 0.0 | 0.0 | 0.0 | 0.0 | 0.0 |
| | 0.0 | 3.0 | 2.0 | 1.0 | 0.0 |
| 17 | 0.71 | 3.8 | 4.8 | 3.8 | 0.71 |
| | 0.0 | 0.0 | 0.0 | 0.0 | 0.0 |
| | 0.0 | 2.0 | 2.0 | 1.0 | 0.0 |
| 18 | 0.71 | 3.8 | 3.8 | 3.8 | 0.71 |
| | 0.0 | 0.0 | 0.0 | 0.0 | 0.0 |
| | 0.0 | 3.0 | 2.0 | 1.0 | 0.0 |

UPPER STAGE: U-235 ENRICHMENT (wt %)
INTERMEDIATE STAGE: PLUTONIUM WEIGHT %
LOWER STAGE: BURNABLE POISON $Gd_2O_3$ WEIGHT %
U-235 ENRICHMENT OF 0.71 wt % MEANS NATURAL URANIUM

Further, with respect to a plant having adequate core shutdown margin, the enrichment of these regions may be made substantially equal to that of the central portions of the fuel rods. Such embodiment will be represented by the following Table 9, which is one modified example of FIGS. 1 and 2 and the Table 1 and the arrangement of the fuel rods is substantially equal to that of FIG. 1.

TABLE 9

| AXIAL POSITION (FROM LOWER END) | $0 \sim \frac{1}{24}$ | $\frac{1}{24} \sim \frac{10}{24}$ | $\frac{10}{24} \sim \frac{20}{24}$ | $\frac{20}{24} \sim \frac{23}{24}$ | $\frac{23}{24} \sim \frac{24}{24}$ |
|---|---|---|---|---|---|
| FUEL NUMBER | | | | | |

TABLE 9-continued

| AXIAL POSITION (FROM LOWER END) | $0 \sim \frac{1}{24}$ | $\frac{1}{24} \sim \frac{10}{24}$ | $\frac{10}{24} \sim \frac{20}{24}$ | $\frac{20}{24} \sim \frac{23}{24}$ | $\frac{23}{24} \sim \frac{24}{24}$ |
|---|---|---|---|---|---|
| 11 |  |  | 0.71<br>8.0<br>0.0 |  |  |
| 12 |  |  | 0.71<br>6.5<br>0.0 |  |  |
| 13 |  |  | 0.71<br>5.0<br>0.0 |  |  |
| 14 |  |  | 0.71<br>2.3<br>0.0 |  |  |
| 15 |  |  | 0.71<br>1.0<br>0.0 |  |  |
| 16 | 0.71<br>0.0<br>0.0 | 4.1<br>0.0<br>3.0 | 5.1<br>0.0<br>2.0 | 5.1<br>0.0<br>1.0 | 0.71<br>0.0<br>0.0 |
| 17 | 0.71<br>0.0<br>0.0 | 4.1<br>0.0<br>2.0 | 5.1<br>0.0<br>2.0 | 3.6<br>0.0<br>1.0 | 0.71<br>0.0<br>0.0 |
| 18 | 0.71<br>0.0<br>0.0 | 4.1<br>0.0<br>0.0 | 4.8<br>0.0<br>0.0 | 3.6<br>0.0<br>1.0 | 0.71<br>0.0<br>0.0 |

UPPER STAGE: U-235 ENRICHMENT (wt %)
INTERMEDIATE STAGE: PLUTONIUM WEIGHT %
LOWER STAGE: BURNABLE POISON Gd$_2$O$_3$ WEIGHT %

In the foregoing embodiments, the enrichment of the regions of 1/24 to 10/24 of the lower portions of the fuel rods 16, 17, 18, 35 and 36 is made lower than that of the central portions of 10/24 to 20/24. This aims to eliminate the distortion of the axial power distribution in the core at the lower portion thereof and thereby to increase the thermal margin. This effect is shown in FIGS. 23A and 23B and has substantially the same extent in a case where the boundary between the lower portion and the central portion of the fuel region is within 8/24 to 14/24 region of the effective length. In addition, in case of adequate thermal margin, it is not necessary to define such boundary and one modified embodiment is represented by the following Table 10, in which the arrangement of the fuel rods is substantially equal to that of FIG. 1. In this embodiment, the enrichment, of 4.3 wt %, of the lower portions of the fuel rods 16, 17 is made substantially equal to that of the central portions thereof.

TABLE 10

| AXIAL POSITION (FROM LOWER END) | $0 \sim \frac{1}{24}$ | $\frac{1}{24} \sim \frac{10}{24}$ | $\frac{10}{24} \sim \frac{20}{24}$ | $\frac{20}{24} \sim \frac{23}{24}$ | $\frac{23}{24} \sim \frac{24}{24}$ |
|---|---|---|---|---|---|
| FUEL NUMBER |  |  |  |  |  |
| 11 |  |  | 0.71<br>8.0<br>0.0 |  |  |
| 12 |  |  | 0.71<br>6.5<br>0.0 |  |  |
| 13 |  |  | 0.71<br>5.0<br>0.0 |  |  |
| 14 |  |  | 0.71<br>2.3<br>0.0 |  |  |
| 15 |  |  | 0.71<br>1.0<br>0.0 |  |  |
| 16 | 0.71<br>0.0<br>0.0 | 4.3<br>0.0<br>3.0 | 4.3<br>0.0<br>2.0 | 3.8<br>0.0<br>1.0 | 0.71<br>0.0<br>0.0 |
| 17 | 0.71<br>0.0<br>0.0 | 4.3<br>0.0<br>2.0 | 3.8<br>0.0<br>2.0 | 3.8<br>0.0<br>1.0 | 0.71<br>0.0<br>0.0 |
| 18 | 0.71<br>0.0<br>0.0 | 4.3<br>0.0<br>3.0 | 3.8<br>0.0<br>2.0 | 3.8<br>0.0<br>1.0 | 0.71<br>0.0<br>0.0 |

UPPER STAGE: U-235 ENRICHMENT (wt %)
INTERMEDIATE STAGE: PLUTONIUM WEIGHT %
LOWER STAGE: BURNABLE POISON Gd$_2$O$_3$ WEIGHT %
·U-235 ENRICHMENT OF 0.71 wt % MEANS NATURAL URANIUM

In the foregoing embodiments, since the fissile material distribution is provided for the uranium fuel rods, i.e. fuel rods 16, 17, 18, 35 and 36, it may be expected to achieve substantially the same effect as that described above by substituting a part or all of them with the MOX fuel rods. This embodiment is represented by the following Table 11, in which the arrangement of the fuel rods is substantially equal to that of FIG. 1.

aims to reduce the unburned portion of the burnable poison and to decrease the reactivity loss.

Further, in the lower regions of 1/24 to 10/24 of the

TABLE 11

| AXIAL POSITION (FROM LOWER END) | 0 ~ 1/24 | 1/24 ~ 10/24 | 10/24 ~ 20/24 | 20/24 ~ 23/24 | 23/24 ~ 24/24 |
|---|---|---|---|---|---|
| FUEL NUMBER | | | | | |
| 11 | | | 0.71<br>8.0<br>0.0 | | |
| 12 | | 0.71<br>6.3<br>0.0 | 0.71<br>6.5<br>0.0 | 0.71<br>6.3<br>0.0 | |
| 13 | | | 0.71<br>5.0<br>0.0 | | |
| 14 | | | 0.71<br>2.3<br>0.0 | | |
| 15 | | | 0.71<br>1.0<br>0.0 | | |
| 16 | 0.71<br>0.0<br>0.0 | 4.3<br>0.0<br>3.0 | 4.3<br>0.0<br>2.0 | 3.8<br>0.0<br>1.0 | 0.71<br>0.0<br>0.0 |
| 17 | 0.71<br>0.0<br>0.0 | 4.3<br>0.0<br>2.0 | 4.3<br>0.0<br>2.0 | 4.3<br>0.0<br>1.0 | 0.71<br>0.0<br>0.0 |
| 18 | 0.71<br>0.0<br>0.0 | 3.8<br>0.0<br>2.0 | 3.8<br>0.0<br>3.0 | 3.8<br>0.0<br>1.0 | 0.71<br>0.0<br>0.0 |

UPPER STAGE: U-235 ENRICHMENT (wt %)
INTERMEDIATE STAGE: PLUTONIUM WEIGHT %
LOWER STAGE: BURNABLE POISON $Gd_2O_3$ WEIGHT %

In this embodiment, each fuel rod 12 includes a region ranged from the lower end to 10/24 region of the effective portion in which plutonium of 6.3 wt % is mixed with respect to the natural uranium, a region ranged from 10/24 to 20/24 region in which plutonium of 6.8 wt % is mixed with respect to the natural uranium, and a region ranged from 20/24 region to the upper end in which plutonium of 6.3 wt % is mixed with respect to the natural uranium. Regarding the fuel rods 16, 17 and 18, the distribution of the enrichment is in the region from the upper end to 23/24 and lower ends to 1/24 is 0.71 wt % and in the region ranged from 1/24 to 23/24 is 4.3 wt %. The distribution of the burnable poison is substantially the same as that shown in FIGS. 1 and 2 and the Table 1. The reactivities of the respective cross sections of the fuel assembly due to the fuel rods 12 are substantially identical to those shown in FIGS. 1 and 2 and the Table 1 and substantially the same effects as those described above are achieved.

Regarding the distribution of the burnable poison, as shown in FIGS. 1 and 2 and the Table 1, the burnable poison does not exist in the regions of ranged from the lower end to 1/24 region and from the upper portion of 23/24 to 24/24 region of the fuel rods 16, 17 and 18 and the distribution of the burnable poison in the regions ranged from 20/24 to 23/24 region is made small in comparison with that in the region of the central portion and the lower portion of 1/24 to 20/24 region. This fuel rods 16, 18 and 35 the concentration of the burnable poison is made large by 1% in comparison with the central regions of 10/24 to 20/24 of these fuel rods. This aims to suppress the distortion of the power at the lower portion of the core. With reference to the embodiment of FIG. 2, the fuel rods 16 and 18 have the same burnable poison distribution but has different distributions of U-235 enrichment which results from the fact that since the fuel rod 18 is disposed near the water gap having a wide width and the output is hence likely to increase, the U-235 enrichment is made low to thereby suppress increasing of the power. In a case where the same fuel rod is provided with regions having different concentrations of the burnable poison, it is desired in view of manufacture that the difference in concentration is made larger by more than 1% at the boundary portion, but in a view point of the suppression of the power distortion at the lower portion of the core, it may be desired that the difference in concentration is of about 0.5%. Thus, in this embodiment, three kinds of fuel rods 16, 17 and 18 are disposed and the difference in their concentrations of the burnable poison is made to about 0.5% in average.

Figure 5:
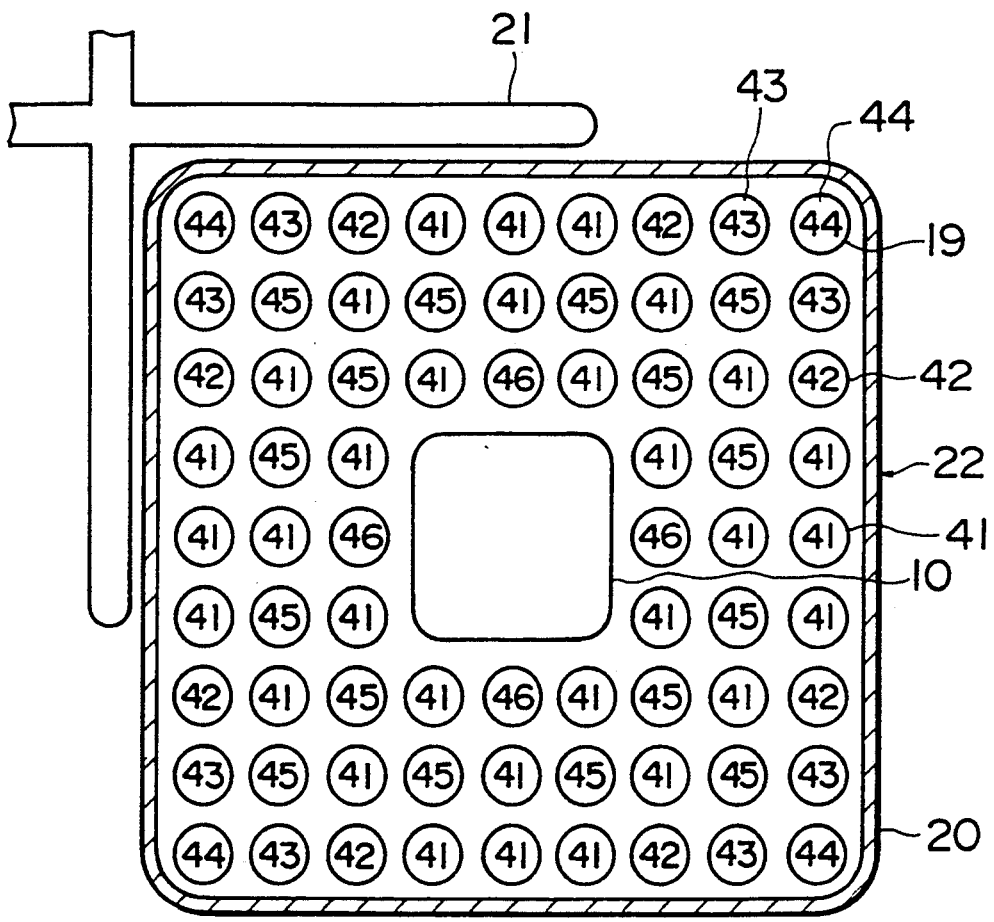
FIG. 5 is a sectional view of a fuel assembly of a further embodiment of the present invention.
Figure 6:
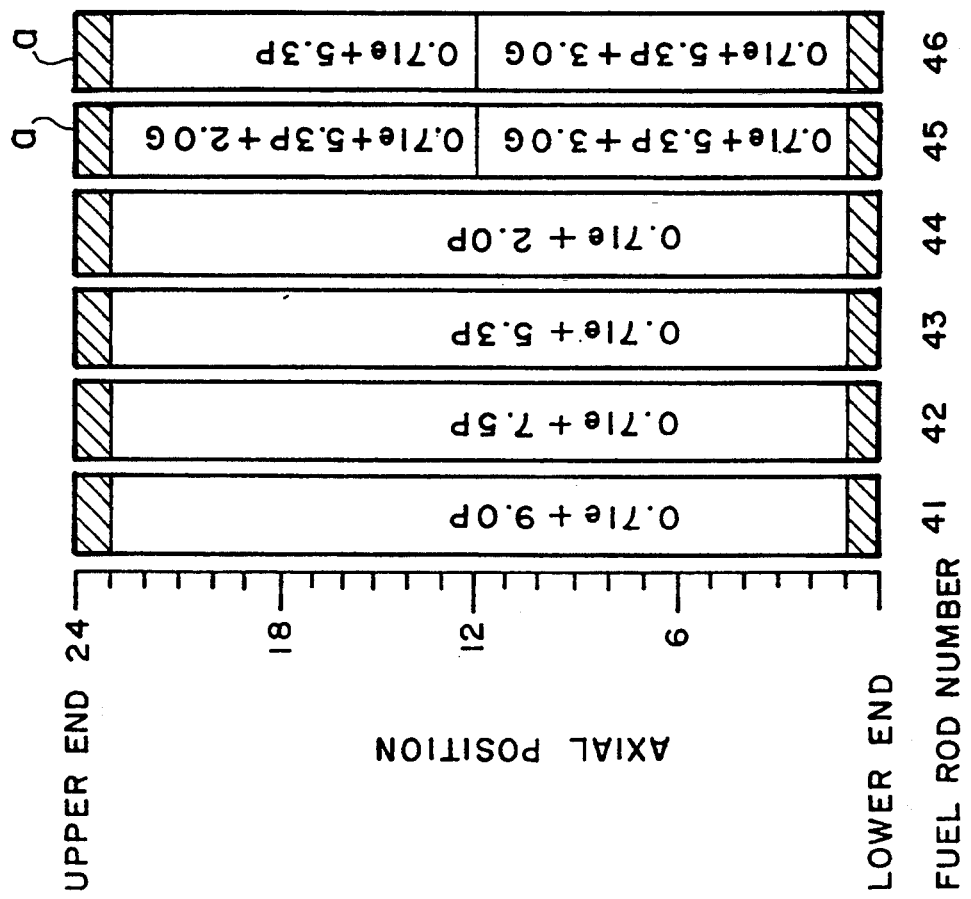
FIG. 6 is a view showing the relationship between fuel enrichment, concentration of plutonium and distribution of gadolinium compound of fuel rods constituting the fuel assembly of FIG. 5.

In the foregoing embodiments, since the burnable poison is mixed with the uranium fuel rods, it may be possible to mix the burnable poison with the MOX fuel rods. Such embodiment is represented by FIGS. 5 and 6 and the following Table 12, in which the water rod 10 has a cross section substantially corresponding to that of nine fuel rods.

TABLE 12

| AXIAL POSITION (FROM LOWER END) | 0 ~ 1/24 | 1/24 ~ 12/24 | 13/24 ~ 23/24 | 23/24 ~ 24/24 |
|---|---|---|---|---|
| FUEL NUMBER | | | | |
| 41 | | 0.71 | 0.71 | 0.71 |

TABLE 12-continued

| AXIAL POSITION (FROM LOWER END) | $0 \sim \frac{1}{24}$ | $\frac{1}{24} \sim \frac{12}{24}$ | $\frac{13}{24} \sim \frac{23}{24}$ | $\frac{23}{24} \sim \frac{24}{24}$ |
|---|---|---|---|---|
|  | 0.0 |  | 9.0 | 0.0 |
|  | 0.0 |  | 0.0 | 0.0 |
| 42 | 0.71 |  | 0.71 | 0.71 |
|  | 0.0 |  | 7.5 | 0.0 |
|  | 0.0 |  | 0.0 | 0.0 |
| 43 | 0.71 |  | 0.71 | 0.71 |
|  | 0.0 |  | 5.3 | 0.0 |
|  | 0.0 |  | 0.0 | 0.0 |
| 44 | 0.71 |  | 0.71 | 0.71 |
|  | 0.0 |  | 2.0 | 0.0 |
|  | 0.0 |  | 0.0 | 0.0 |
| 45 | 0.71 | 0.71 | 0.71 | 0.71 |
|  | 0.0 | 5.3 | 5.3 | 0.0 |
|  | 0.0 | 3.0 | 2.0 | 0.0 |
| 46 | 0.71 | 0.71 | 0.71 | 0.71 |
|  | 0.0 | 5.3 | 5.3 | 0.0 |
|  | 0.0 | 3.0 | 0.0 | 0.0 |

UPPER STAGE: U-235 ENRICHMENT (wt %)
INTERMEDIATE STAGE: PLUTONIUM WEIGHT %
LOWER STAGE: BURNABLE POISON Gd$_2$O$_3$ WEIGHT %
U-235 ENRICHMENT OF 0.71 wt % MEANS NATURAL URANIUM

Referring to FIG. 6, the fuel rod 45 includes axial regions in which 1/24 regions of the upper and lower ends of the natural uranium, 1/24 to 12/24 region of the fuel mixture of natural uranium, plutonium of 5.3 wt % and gadolinium compound of 3.0 wt % as burnable poison, and 2/24 to 23/24 region of the fuel mixture of natural uranium, plutonium of 5.3 wt % and gadolinium compound of 2.0 wt % as burnable poison. The fuel rod 46 includes axial regions in which 1/24 regions of the upper and lower ends of the natural uranium, 1/24 to 12/24 region of the fuel mixture of natural uranium, plutonium of 5.3 wt %, and gadolinium and 12/24 to 23/24 region of the fuel mixture of natural uranium, plutonium of 5.3 wt %.

Figure 7:
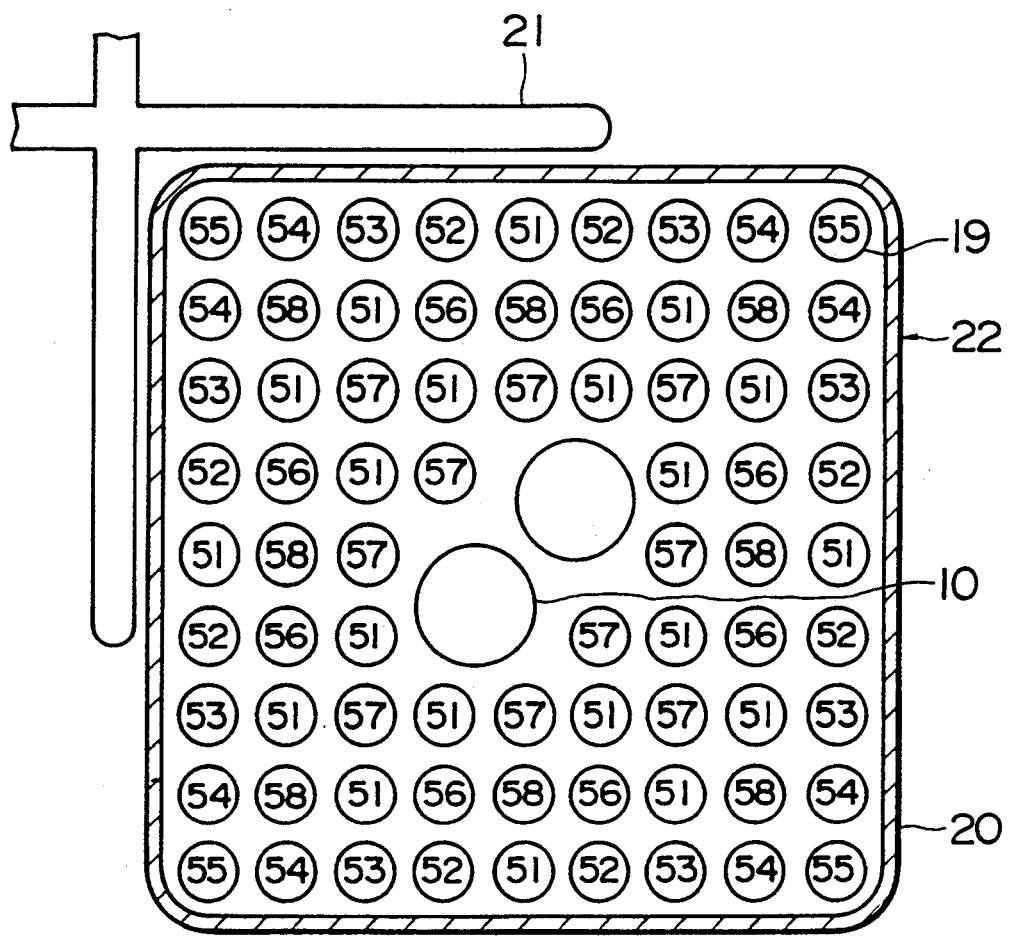
FIG. 7 is a sectional view of a fuel assembly of still further embodiment of the present invention.
Figure 8:
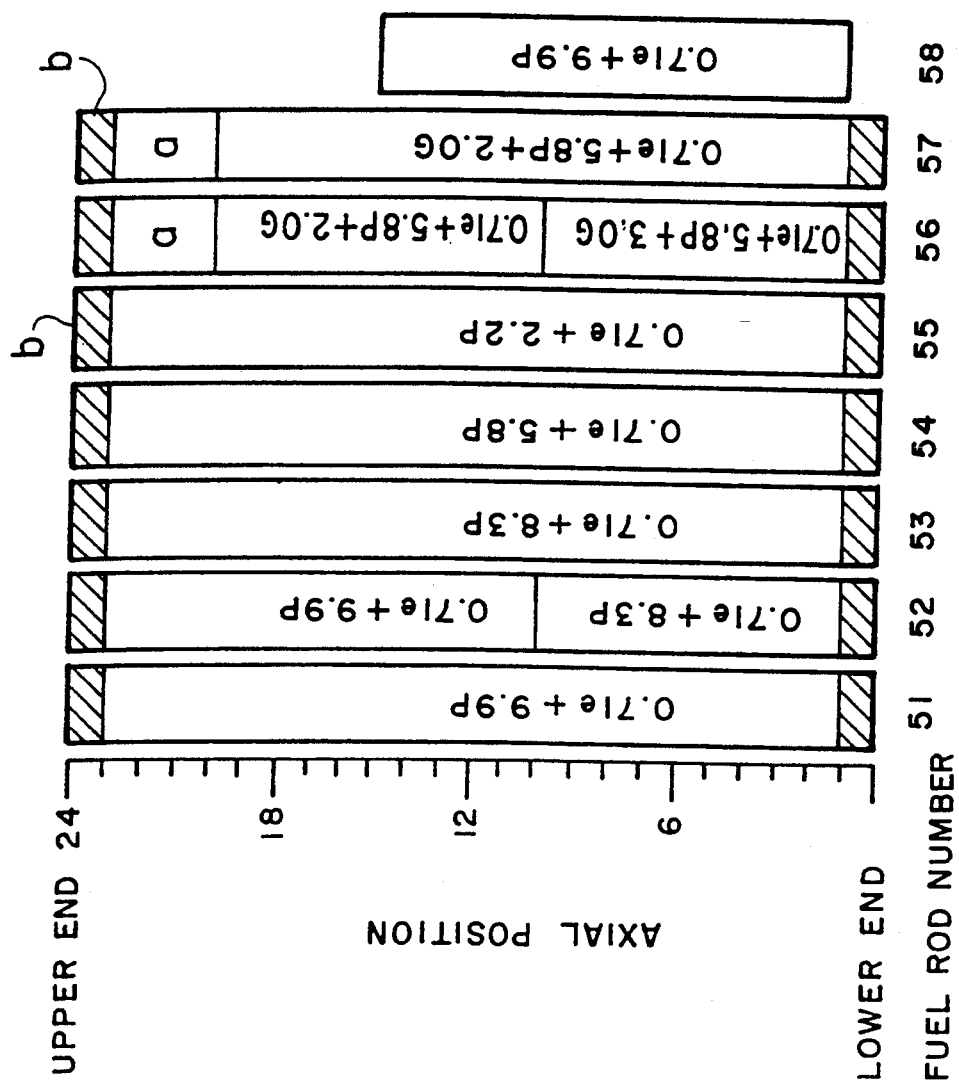
FIG. 8 is a view showing the relationship between fuel enrichment, concentration of plutonium and distribution of gadolinium compound of fuel rods constituting the fuel assembly of FIG. 7.
Figure 9:
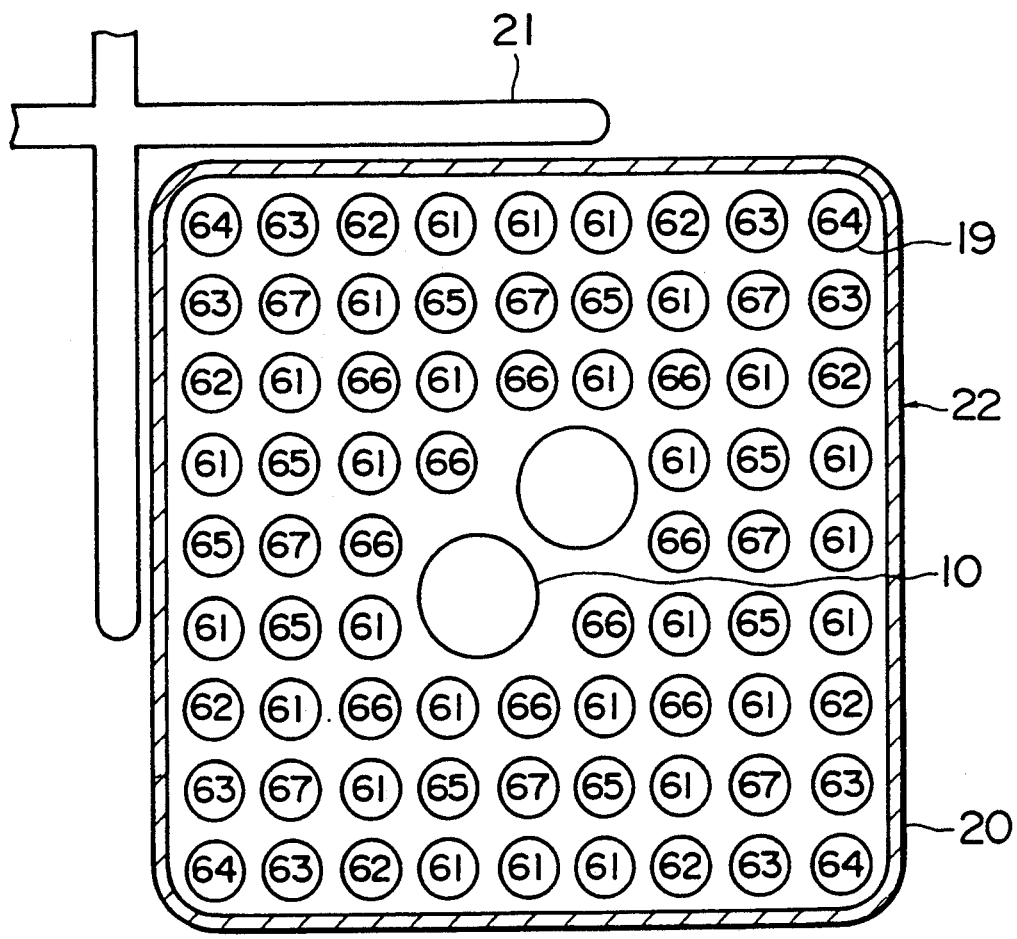
FIG. 9 is a sectional view of a fuel assembly of a still further embodiment of the present invention.
Figure 10:
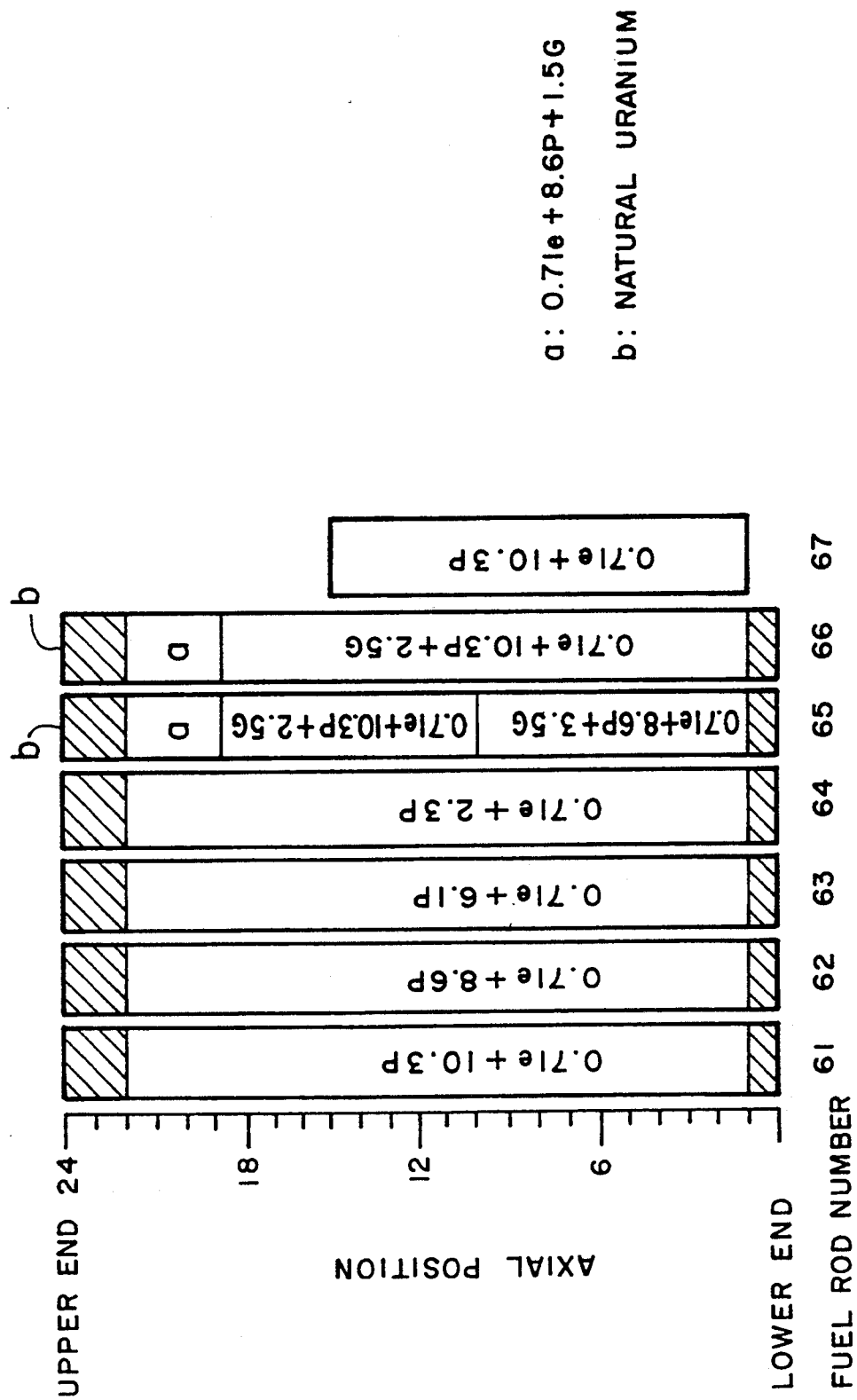
FIG. 10 is a view showing the relationship between fuel enrichment, concentration of plutonium and distribution of gadolinium compound of fuel rods constituting the fuel assembly of FIG. 9.

Further, FIGS. 7 and 8 and Table 13, and FIGS. 9 and 10 and Table 14 represent further embodiments in which the burnable poison is mixed with the MOX fuel rod. In the former embodiment, fuel rods mixed with the burnable poison and fuel rods having different distributions of the mixed amount of the plutonium except for the blanket region are arranged separately and in the latter embodiment, a portion of the fuel rods in which the burnable poison is mixed has different plutonium amount distribution.

TABLE 13

| AXIAL POSITION (FROM LOWER END) | $0 \sim \frac{1}{24}$ | $\frac{1}{24} \sim \frac{10}{24}$ | $\frac{10}{24} \sim \frac{15}{24}$ | $\frac{15}{24} \sim \frac{19}{24}$ | $\frac{19}{24} \sim \frac{23}{24}$ | $\frac{23}{24} \sim \frac{24}{24}$ |
|---|---|---|---|---|---|---|
| FUEL NUMBER |  |  |  |  |  |  |
| 51 | 0.71 |  | 0.71 |  |  | 0.71 |
|  | 0.0 |  | 9.9 |  |  | 0.0 |
|  | 0.0 |  | 0.0 |  |  | 0.0 |
| 52 | 0.71 | 0.71 |  | 0.71 |  | 0.71 |
|  | 0.0 | 8.3 |  | 9.9 |  | 0.0 |
|  | 0.0 | 0.0 |  | 0.0 |  | 0.0 |
| 53 | 0.71 |  | 0.71 |  |  | 0.71 |
|  | 0.0 |  | 8.3 |  |  | 0.0 |
|  | 0.0 |  | 0.0 |  |  | 0.0 |
| 54 | 0.71 |  | 0.71 |  |  | 0.71 |
|  | 0.0 |  | 5.8 |  |  | 0.0 |
|  | 0.0 |  | 0.0 |  |  | 0.0 |
| 55 | 0.71 |  | 0.71 |  |  | 0.71 |
|  | 0.0 |  | 2.2 |  |  | 0.0 |
|  | 0.0 |  | 0.0 |  |  | 0.0 |
| 56 | 0.71 | 0.71 | 0.71 |  | 0.71 | 0.71 |
|  | 0.0 | 5.8 | 5.8 |  | 5.8 | 0.0 |
|  | 0.0 | 3.0 | 2.0 |  | 1.0 | 0.0 |
| 57 | 0.71 |  |  | 0.71 | 0.71 | 0.71 |
|  | 0.0 |  |  | 5.8 | 5.8 | 0.0 |
|  | 0.0 |  |  | 2.0 | 1.0 | 0.0 |
| 58 | — | 0.71 |  |  |  | — |
|  |  | 9.9 |  |  |  |  |
|  |  | 0.0 |  |  |  |  |

UPPER STAGE: U-235 ENRICHMENT
INTERMEDIATE STAGE: PLUTONIUM WEIGHT %
LOWER STAGE: BURNABLE POISON Gd$_2$O$_3$ WEIGHT %

TABLE 14

| AXIAL POSITION (FROM LOWER END) | $0 \sim \frac{1}{24}$ | $\frac{1}{24} \sim \frac{10}{24}$ | $\frac{10}{24} \sim \frac{15}{24}$ | $\frac{15}{24} \sim \frac{19}{24}$ | $\frac{19}{24} \sim \frac{23}{24}$ | $\frac{23}{24} \sim \frac{24}{24}$ |
|---|---|---|---|---|---|---|
| FUEL NUMBER |  |  |  |  |  |  |

TABLE 14-continued

| AXIAL POSITION (FROM LOWER END) | $0 \sim \frac{1}{24}$ | $\frac{1}{24} \sim \frac{10}{24}$ | $\frac{10}{24} \sim \frac{15}{24}$ | $\frac{15}{24} \sim \frac{19}{24}$ | $\frac{19}{24} \sim \frac{23}{24}$ | $\frac{23}{24} \sim \frac{24}{24}$ |
|---|---|---|---|---|---|---|
| 61 | 0.71 |  |  | 0.71 |  | 0.71 |
|  | 0.0 |  |  | 10.3 |  | 0.0 |
|  | 0.0 |  |  | 0.0 |  | 0.0 |
| 62 | 0.71 |  |  | 0.71 |  | 0.71 |
|  | 0.0 |  |  | 8.6 |  | 0.0 |
|  | 0.0 |  |  | 0.0 |  | 0.0 |
| 63 | 0.71 |  |  | 0.71 |  | 0.71 |
|  | 0.0 |  |  | 6.1 |  | 0.0 |
|  | 0.0 |  |  | 0.0 |  | 0.0 |
| 64 | 0.71 |  |  | 0.71 |  | 0.71 |
|  | 0.0 |  |  | 2.3 |  | 0.0 |
|  | 0.0 |  |  | 0.0 |  | 0.0 |
| 65 | 0.71 | 0.71 |  | 0.71 | 0.71 | 0.71 |
|  | 0.0 | 8.6 |  | 10.3 | 8.6 | 0.0 |
|  | 0.0 | 3.5 |  | 2.5 | 1.5 | 0.0 |
| 66 | 0.71 |  | 0.71 |  | 0.71 | 0.71 |
|  | 0.0 |  | 10.3 |  | 8.6 | 0.0 |
|  | 0.0 |  | 2.5 |  | 1.5 | 0.0 |
| 67 | — |  | 0.71 |  |  | — |
|  |  |  | 10.3 |  |  |  |
|  |  |  | 0.0 |  |  |  |

UPPER STAGE: U-235 ENRICHMENT
INTERMEDIATE STAGE: PLUTONIUM WEIGHT %
LOWER STAGE: BURNABLE POISON $Gd_2O_3$ WEIGHT %
U-235 ENRICHMENT OF 0.71 wt % MEANS NATURAL URANIUM

In the foregoing embodiments, the ratio of water with respect to fuel, i.e. water-fuel ratio, is improved in comparison with conventional fuels. For example, in the embodiment of FIG. 1, a water rod occupying an area corresponding to four fuel rods, i.e. about 6% of fuel rods, is replaced by a water rod. The ratios in the embodiments of FIGS. 3 and 5 are about 9% and 11%, respectively. As described hereinbefore, according to the present embodiments, the degradation of the shutdown margin of the core due to the charging of the MOX fuel into the core can be effectively suppressed.

The number of the fuel rods mixed with the burnable poison is 7 to 9 of conventional replaceable fuel rods of the BWR, which is about less than 15% of the total number of the fuel rods. On the other hand, with respect to the embodiment represented by FIG. 1, the number of the MOX fuel rods is 46, which is about 77% of the total number of the fuel rods, and the number of the fuel rods mixed with the burnable poison is 14, which is about 23% of the total number thereof. With respect to the embodiment of FIG. 3, the number of the MOX fuel rods is 58, which is about 76% of the total number of the fuel rods and the number of fuel rods mixed with the burnable poison is 18, which is about 24% of the total number thereof. With respect to the embodiment of FIG. 5, all fuel rods are MOX fuel rods and the fuel rods mixed with the burnable poison is the number of 20, which is about 28% of the total number %.

The concentration of the gadolinium compound is 1 to 3.5 wt %. The reactivity characteristics can be made identical to that of the uranium fuel by making the mixing amount of the burnable poison most suitable, thus sufficiently ensuring the reactor shutdown margin and the thermal margin.

In the foregoing embodiments, the uranium with which the plutonium is mixed is natural uranium.

Embodiments in which depleted uranium or recycled uranium is utilized in place of the natural uranium will be described hereunder.

Table 15 represents an embodiment in which the plutonium is mixed with the depleted uranium (U-235 enrichment of 0.25 wt %) and the fuel rod arrangement is substantially the same as that of FIG. 1. The concentration of the plutonium is increased by 0.4% with respect to the fuel rods 11 to 15, because the increasing of the plutonium concentration compensates for in the reactivity the decreasing of the U-235 concentration from 0.71 wt % to 0.25 wt %.

TABLE 15

| AXIAL POSITION (FROM LOWER END) | $0 \sim \frac{1}{24}$ | $\frac{1}{24} \sim \frac{10}{24}$ | $\frac{10}{24} \sim \frac{20}{24}$ | $\frac{20}{24} \sim \frac{23}{24}$ | $\frac{23}{24} \sim \frac{24}{24}$ |
|---|---|---|---|---|---|
| FUEL NUMBER |  |  |  |  |  |
| 11 |  |  | 0.25 |  |  |
|  |  |  | 8.4 |  |  |
|  |  |  | 0.0 |  |  |
| 12 |  |  | 0.25 |  |  |
|  |  |  | 6.9 |  |  |
|  |  |  | 0.0 |  |  |
| 13 |  |  | 0.25 |  |  |
|  |  |  | 5.4 |  |  |
|  |  |  | 0.0 |  |  |
| 14 |  |  | 0.25 |  |  |
|  |  |  | 2.7 |  |  |
|  |  |  | 0.0 |  |  |
| 15 |  |  | 0.25 |  |  |
|  |  |  | 1.4 |  |  |
|  |  |  | 0.0 |  |  |
| 16 | 0.71 | 3.8 | 4.8 | 3.8 | 0.71 |

TABLE 15-continued

| AXIAL POSITION (FROM LOWER END) | $0 \sim \frac{1}{24}$ | $\frac{1}{24} \sim \frac{10}{24}$ | $\frac{10}{24} \sim \frac{20}{24}$ | $\frac{20}{24} \sim \frac{23}{24}$ | $\frac{23}{24} \sim \frac{24}{24}$ |
|---|---|---|---|---|---|
| | 0.0 | 0.0 | 0.0 | 0.0 | 0.0 |
| | 0.0 | 3.0 | 2.0 | 1.0 | 0.0 |
| 17 | 0.71 | 3.8 | 4.8 | 3.8 | 0.71 |
| | 0.0 | 0.0 | 0.0 | 0.0 | 0.0 |
| | 0.0 | 2.0 | 2.0 | 1.0 | 0.0 |
| 18 | 0.71 | 3.8 | 3.8 | 3.8 | 0.71 |
| | 0.0 | 0.0 | 0.0 | 0.0 | 0.0 |
| | 0.0 | 3.0 | 2.0 | 1.0 | 0.0 |

UPPER STAGE: U-235 ENRICHMENT (wt %)
INTERMEDIATE STAGE: PLUTONIUM WEIGHT %
LOWER STAGE: BURNABLE POISON $Gd_2O_3$ WEIGHT %
·U-235 ENRICHMENT OF 0.71 wt % MEANS NATURAL URANIUM
·U-235 ENRICHMENT OF 0.25 wt % MEANS DEPLETED URANIUM

According to this embodiment, the amount of the natural uranium can be reduced. Furthermore, the plutonium amount per fuel assembly can be increased and, hence, the total amount of the MOX fuel assembly can be decreased, so that the delivery cost can be also decreased.

Table 16 represents an embodiment in which the recycled uranium (U-235 enrichment of 0.8 wt %) is used, and in which the recycled uranium is used for the blanket portions of the MOX fuel rod and uranium fuel rod and the plutonium mixing region of the MOX fuel rod, whereby the amount of the natural uranium can be saved, thus being economical.

tuted therefor. In such case, substantially the same effect can be achieved.

In the described embodiments, the length of the fuel rod plenum portion of the fuel rod is made equal to that of the uranium fuel rod except for some embodiments.

Furthermore, Table 17 represents an embodiment as a modified embodiment of FIGS. 1 and 2, in which the long fuel plenum portion of the MOX fuel rod may be made longer by 1/48 length than that of the uranium fuel rod. In such case, since the fuel plenum portion is made longer by 1/48 in the upper portion of the fuel rod, the length of the fuel effective portion is made short by 1/48 in comparison with the uranium fuel rod.

TABLE 16

| AXIAL POSITION (FROM LOWER END) | $0 \sim \frac{1}{24}$ | $\frac{1}{24} \sim \frac{10}{24}$ | $\frac{10}{24} \sim \frac{20}{24}$ | $\frac{20}{24} \sim \frac{23}{24}$ | $\frac{23}{24} \sim \frac{24}{24}$ |
|---|---|---|---|---|---|
| FUEL NUMBER | | | | | |
| 11 | 0.8 | | 0.8 | | 0.8 |
| | 0.0 | | 8.7 | | 0.0 |
| | 0.0 | | 0.0 | | 0.0 |
| 12 | 0.8 | | 0.8 | | 0.8 |
| | 0.0 | | 7.1 | | 0.0 |
| | 0.0 | | 0.0 | | 0.0 |
| 13 | 0.8 | | 0.8 | | 0.8 |
| | 0.0 | | 5.5 | | 0.0 |
| | 0.0 | | 0.0 | | 0.0 |
| 14 | 0.8 | | 0.8 | | 0.8 |
| | 0.0 | | 2.5 | | 0.0 |
| | 0.0 | | 0.0 | | 0.0 |
| 15 | 0.8 | | 0.8 | | 0.8 |
| | 0.0 | | 1.1 | | 0.0 |
| | 0.0 | | 0.0 | | 0.0 |
| 16 | 0.8 | 3.8 | 4.8 | 3.8 | 0.8 |
| | 0.0 | 0.0 | 0.0 | 0.0 | 0.0 |
| | 0.0 | 3.0 | 2.0 | 1.0 | 0.0 |
| 17 | 0.8 | 3.8 | 4.8 | 3.8 | 0.8 |
| | 0.0 | 0.0 | 0.0 | 0.0 | 0.0 |
| | 0.0 | 2.0 | 2.0 | 1.0 | 0.0 |
| 18 | 0.8 | 3.8 | 3.8 | 3.8 | 0.8 |
| | 0.0 | 0.0 | 0.0 | 0.0 | 0.0 |
| | 0.0 | 3.0 | 2.0 | 1.0 | 0.0 |

UPPER STAGE: U-235 ENRICHMENT (wt %)
INTERMEDIATE STAGE: PLUTONIUM WEIGHT %
LOWER STAGE: BURNABLE POISON $Gd_2O_3$ WEIGHT %
·U-235 ENRICHMENT OF 0.80 wt % MEANS RECYCLED URANIUM

In these embodiments, the uranium mixed with plutonium is all used with depleted uranium or recycled uranium, but in a modification, which is partially substi- Accordingly, the inner pressure of the fuel rod can be made equal to that of the uranium fuel rod at the burning progressing time, thus ensuring the soundness of the fuel.

TABLE 17

| AXIAL POSITION (FROM LOWER END) | $0 \sim \frac{2}{24}$ | $\frac{2}{24} \sim \frac{10}{24}$ | $\frac{10}{24} \sim \frac{20}{24}$ | $\frac{20}{24} \sim \frac{23}{24}$ | $\frac{23}{24} \sim \frac{47}{48}$ | $\frac{47}{48} \sim \frac{48}{48}$ |
|---|---|---|---|---|---|---|
| FUEL NUMBER | | | | | | |
| 11 | | | 0.71 | | | * |

TABLE 17-continued

| AXIAL POSITION (FROM LOWER END) | 0 ~ 2/24 | 2/24 ~ 10/24 | 10/24 ~ 20/24 | 20/24 ~ 23/24 | 23/24 ~ 47/48 | 47/48 ~ 48/48 |
|---|---|---|---|---|---|---|
| 12 | | | 8.0<br>0.0<br>0.71 | | | * |
| | | | 6.5<br>0.0 | | | |
| 13 | | | 0.71 | | | * |
| | | | 5.0<br>0.0 | | | |
| 14 | | | 0.71 | | | * |
| | | | 2.3<br>0.0 | | | |
| 15 | | | 0.71 | | | * |
| | | | 1.0<br>0.0 | | | |
| 16 | 0.71<br>0.0<br>0.0 | 3.8<br>0.0<br>3.0 | 4.8<br>0.0<br>2.0 | 3.8<br>0.0<br>1.0 | 0.71<br>0.0<br>0.0 | |
| 17 | 0.71<br>0.0<br>0.0 | 3.8<br>0.0<br>2.0 | 4.8<br>0.0<br>2.0 | 3.8<br>0.0<br>1.0 | 0.71<br>0.0<br>0.0 | |
| 18 | 0.71<br>0.0<br>0.0 | 3.8<br>0.0<br>3.0 | 3.8<br>0.0<br>2.0 | 3.8<br>0.0<br>1.0 | 0.71<br>0.0<br>0.0 | |

UPPER STAGE: U-235 ENRICHMENT
INTERMEDIATE STAGE: PLUTONIUM WEIGHT %
LOWER STAGE: BURNABLE POISON $Gd_2O_3$ WEIGHT %
U-235 ENRICHMENT OF 0.71 wt % MEANS NATURAL URANIUM
*FUEL PLENUM PACKED WITH NO FUEL PELLET

In the above described embodiment, the upper fuel plenum portion of the fuel rod is made long, but the lower fuel plenum portion may also be made long, and in this case, substantially the same effect will be achieved.

The inner pressure of the fuel rod can be decreased by elongating the fuel plenum portion by the amount corresponding to the elongated length, but the length of the fuel effective portion is hence made short, which results in the reduction of the fuel amount to be charged in the core, thus lowering the fuel economy and causing tendency of lowering the thermal margin. In consideration of the balance of these facts, it is desired that the elongated amount of length of the fuel plenum portion of the MOX fuel rod is within about 1/24 length of the fuel effective length of the uranium fuel rod.

Figure 11:
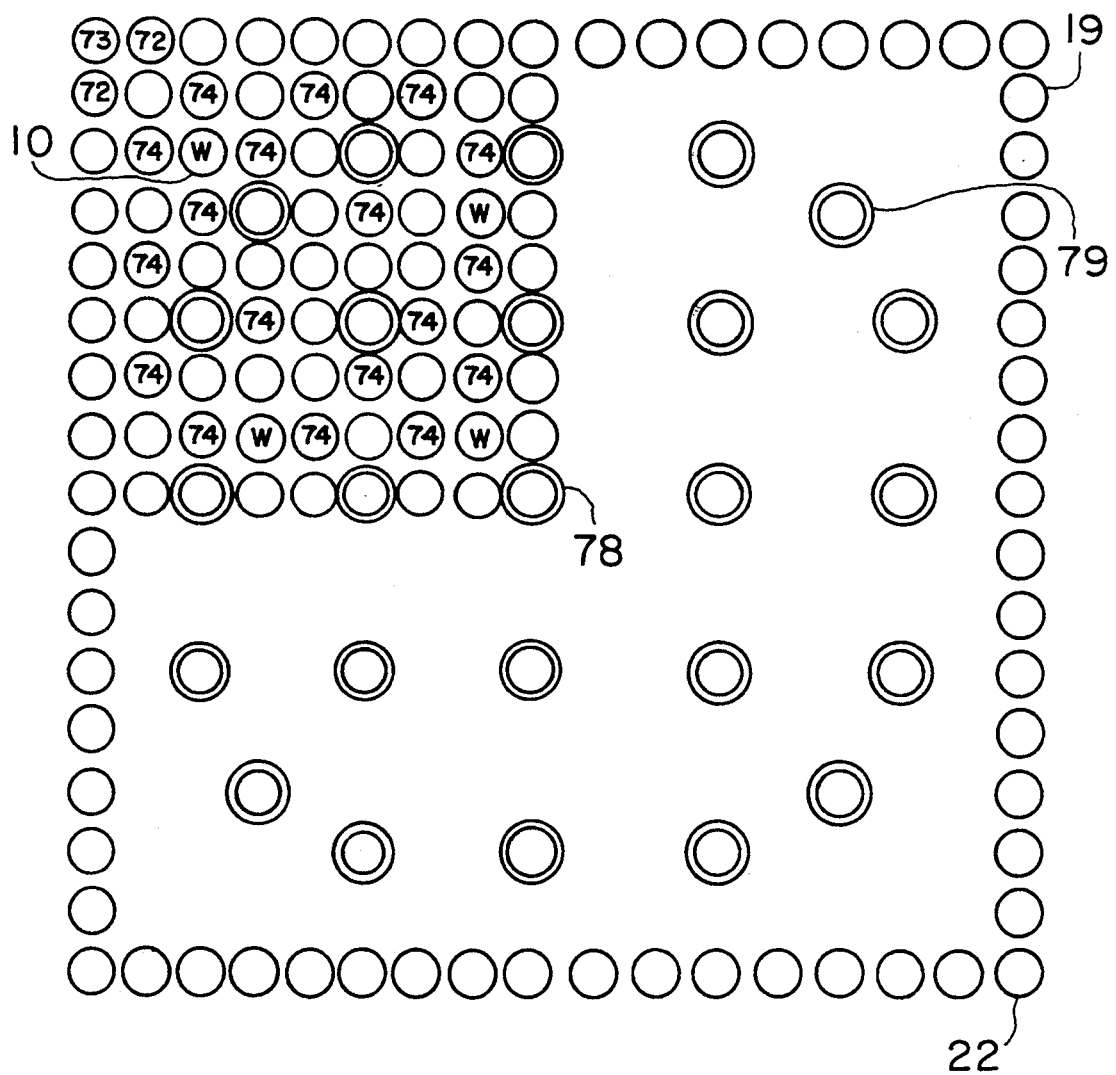
FIG. 11 is a sectional view of a fuel assembly of one embodiment applicable to a PWR according to the present invention.
Figure 12:
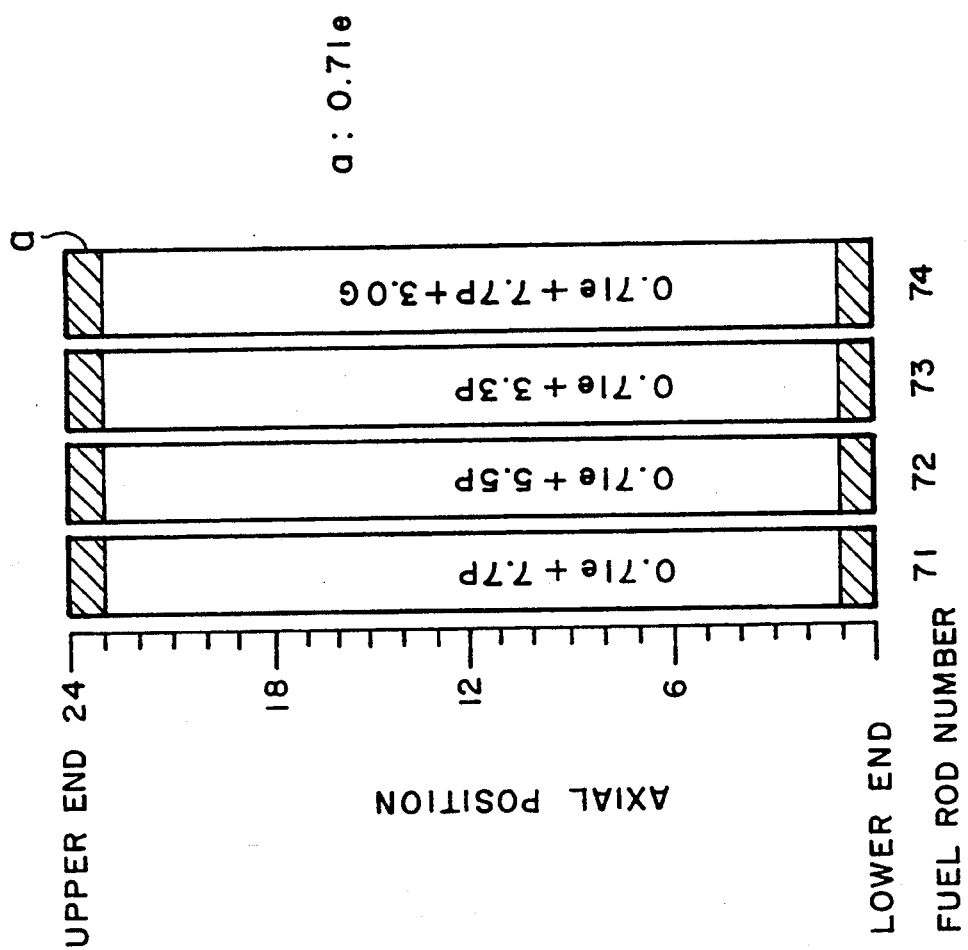
FIG. 12 is a view showing the relationship between fuel enrichment, concentration of plutonium and distribution of gadolinium compound of fuel rods constituting the fuel assembly of FIG. 9.

In the foregoing description, there is mentioned the embodiments with respect to the BWR, embodiments with respect to the fuel assembly of the PWR will be described hereunder with reference to FIGS. 11 and 12 and Table 18.

Figure 13:
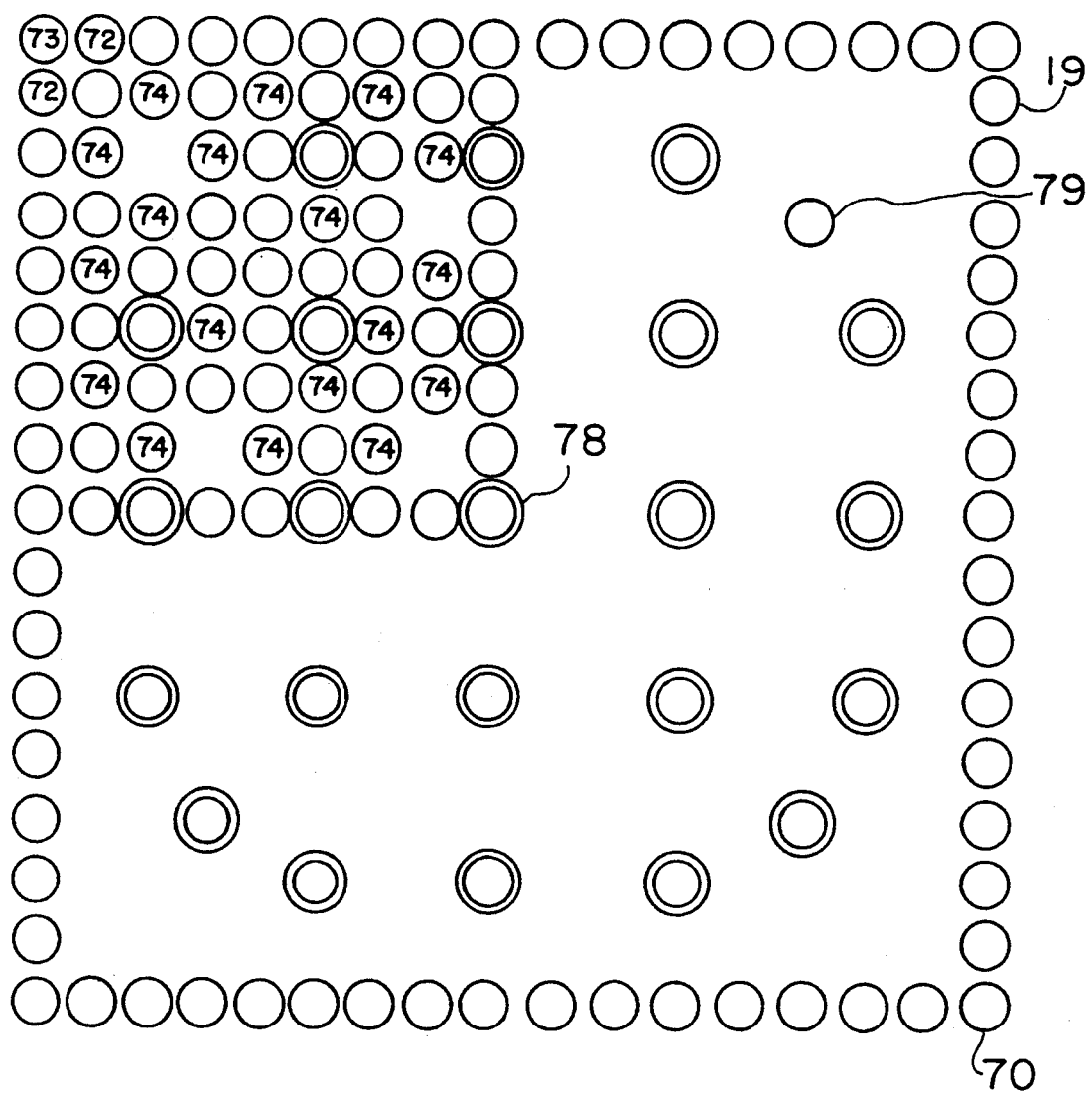
FIG. 13 is a sectional view of a modified example of the embodiment of FIG. 11.
Figure 14:
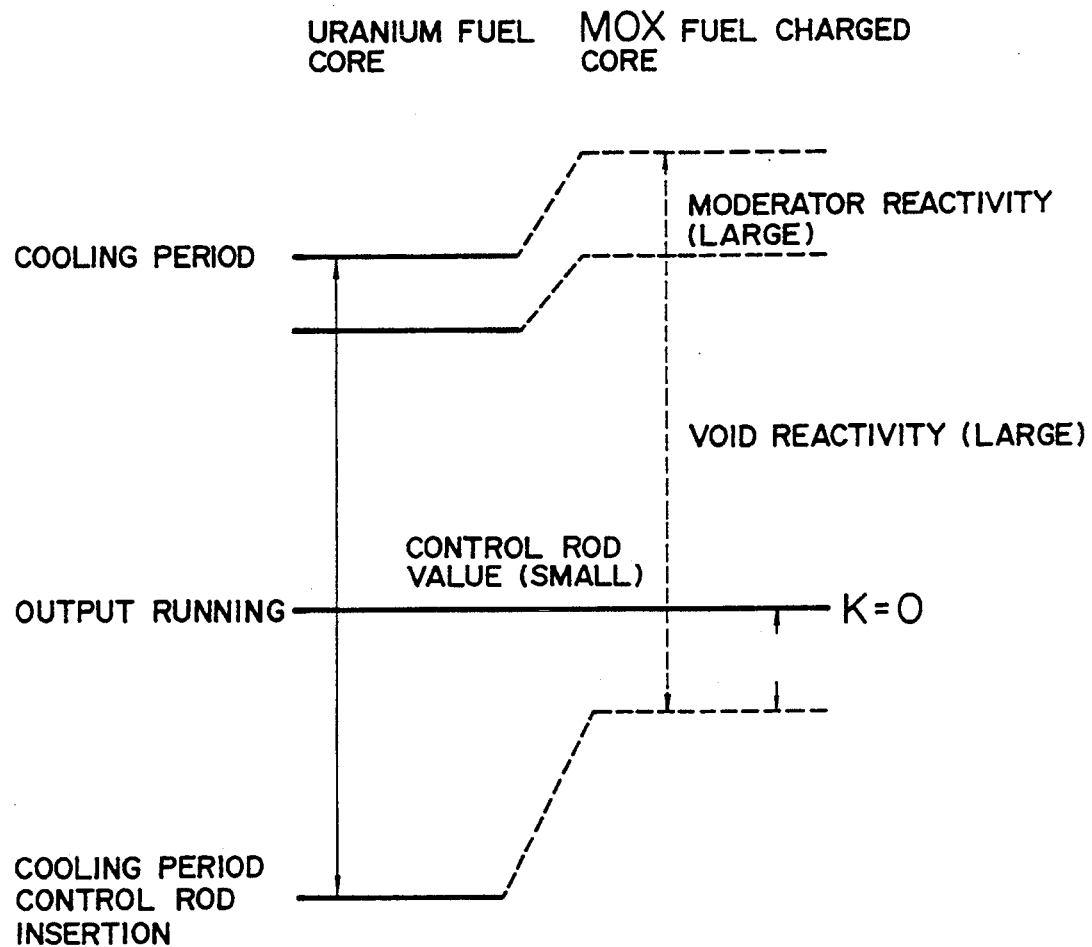
FIG. 14 is a graph describing the degradation of core characteristics due to the charge of the MOX fuel.
Figures 15A, 15B, 15C:
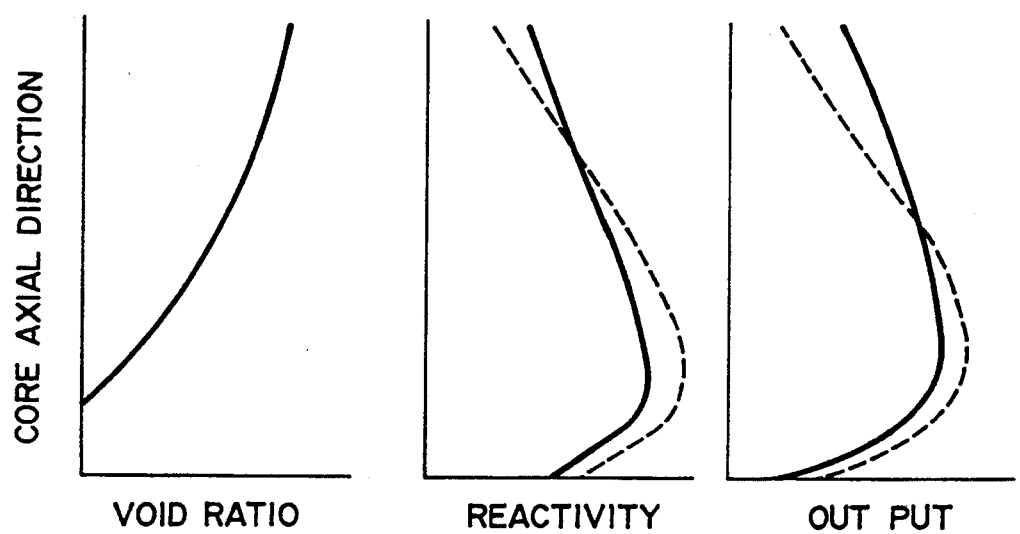
FIGS. 15A, 15B and 15C are graphs is a graph describing the degradation of core characteristics due to the charge of the MOX fuel.
Figure 16:
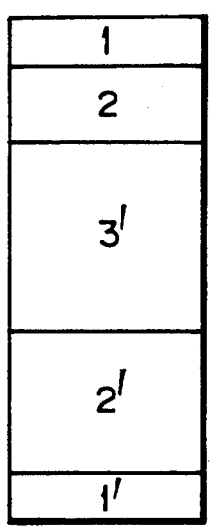
FIG. 16 is a view describing the basic conception of the enrichment distribution of the fuel assembly.
Figure 17:
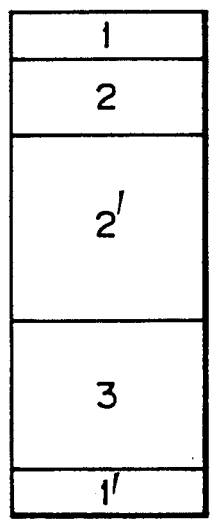
FIG. 17 is a view describing the basic conception of the gadolinium compound distribution of the fuel assembly according to the present invention.
Figure 18:
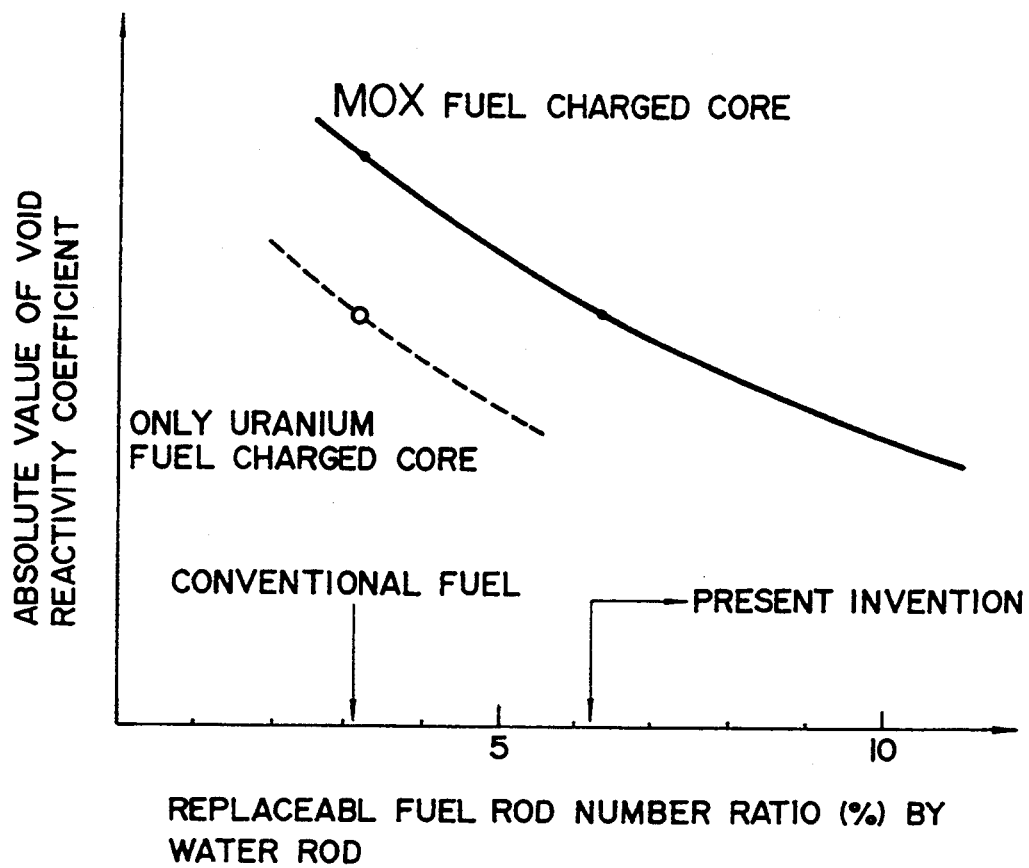
FIG. 18 is a view describing the relation between the number of replaceable fuel rods with a water rod and the absolute value of the void reactivity coefficient.
Figure 19:
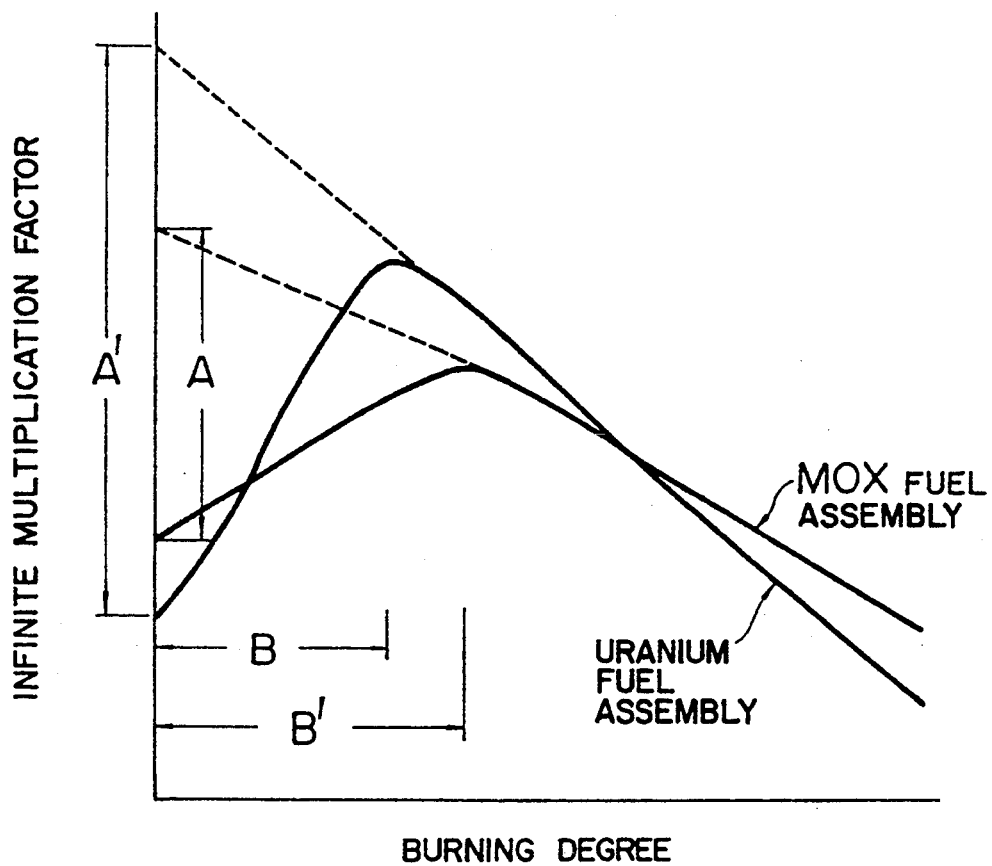
FIG. 19 is a view of operation mode showing infinite multiplication factor of a MOX fuel assembly and a uranium fuel assembly.
Figure 20A:
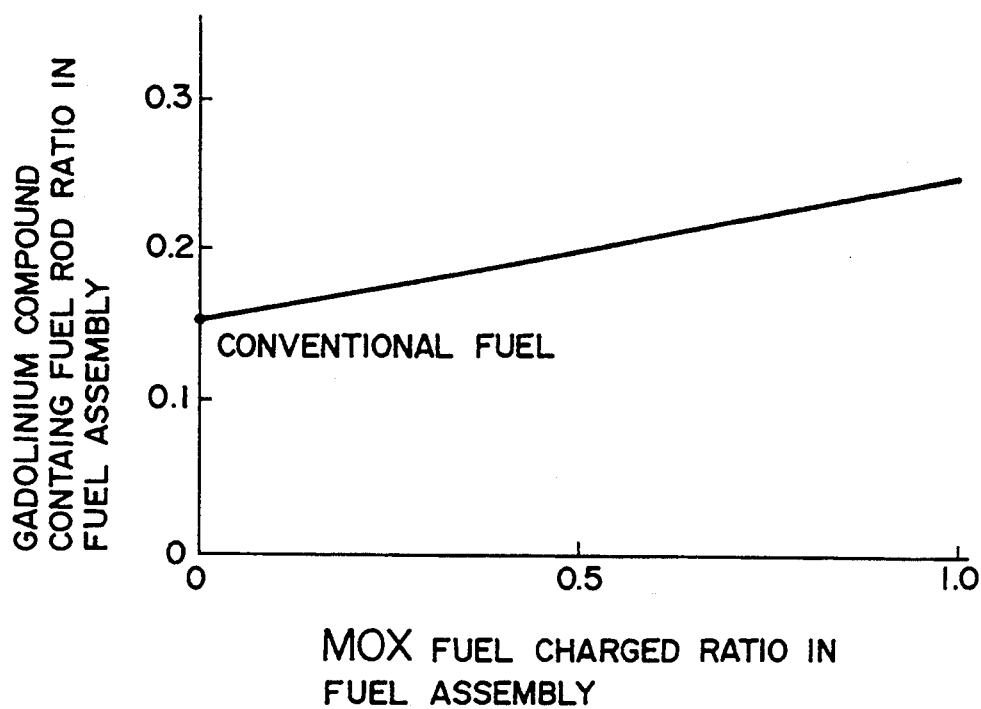
FIG. 20A is a view showing the most suitable parameter of a fuel rod containing gadolinium compound of the MOX fuel assembly and FIG. 20B is a view showing the most suitable gadolinium compound concentration of the gadolinium compound fuel rod.
Figure 20B:
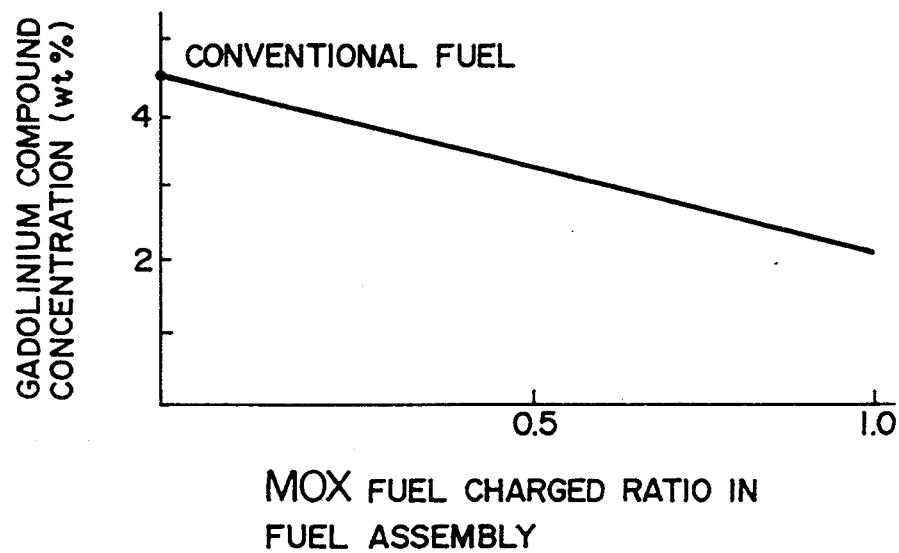
Figure 21:
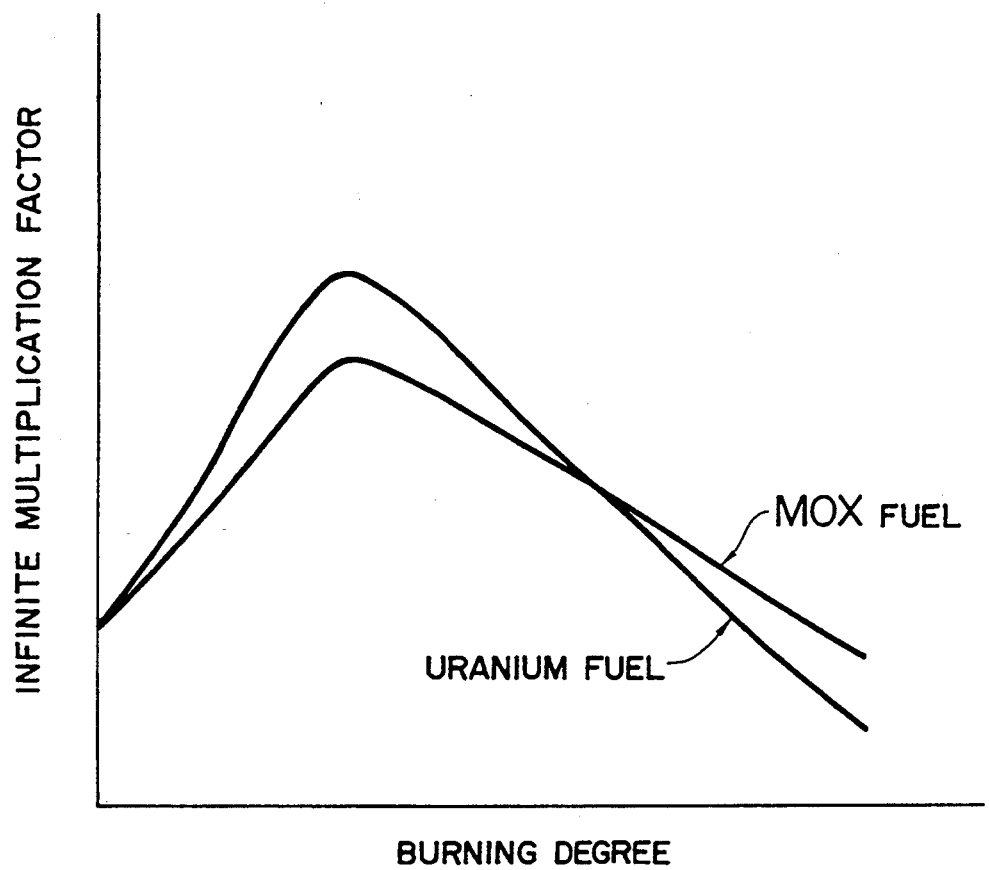
FIG. 21 is a view of operation mode showing infinite multiplication factor of the MOX with most suitable parameters of gadolinium compound fuel and the uranium fuel.

The fuel assembly 22 of this embodiment is of the replaceable fuel for the PWR, which comprises fuel rods 19, an instrumentation guide thimble 78, control rod guide thimbles 79, water rods 10, upper and lower nozzles and supporting grids, not shown. The fuel assembly 22 has a support structure composing twenty-four control rod guide thimbles 79, one instrumentation guide thimble 78 and nine supporting grids jointed thereto. The fuel rods 19 and the water rods 10 are inserted into the support structure. The instrumentation guide thimble 78 and the control rod guide thimbles 79 are secured to the upper and lower nozzles, not shown. FIG. 11 shows an arrangement of the fuel assembly 22 at a quarter portion and the arrangements of the other quarter portions are made mirror symmetric with respect to the symmetric axes. The axial distributions of the fuel rods 71, 72, 73 and 74 are shown in FIG. 12 and Table 17. In the embodiment of FIG. 11, the water rod 10 is composed of a zircalloy tube having upper and lower ends which are the same as those of the fuel rod but provided with an upper and lower holes through which a coolant passes. FIG. 13 represents a modified embodiment of FIG. 12 and referring to FIG. 13, any

TABLE 18

| AXIAL POSITION (FROM LOWER END) | 0 ~ 1/24 | 2/24 ~ 22/24 | 23/24 ~ 24/24 |
|---|---|---|---|
| FUEL NUMBER | | | |
| 71 | | 0.71<br>7.7<br>0.0 | |
| 72 | | 0.71<br>5.5<br>0.0 | |
| 73 | | 0.71<br>3.3<br>0.0 | |
| 74 | 0.71<br>7.0<br>0.0 | 0.71<br>7.0<br>3.0 | 0.71<br>7.0<br>0.0 |

UPPER STAGE: U-235 ENRICHMENT
INTERMEDIATE STAGE: PLUTONIUM WEIGHT %
LOWER STAGE: BURNABLE POISON $Gd_2O_3$ WEIGHT % water rod is not arranged and fuel rod is also removed. These embodiments can also attain substantially the same effects as those described above. The fuel rod 74 is mixed with a gadolinium compound as the burnable poison. The concentration of the gadolinium compound is zero at the upper and lower end portion. Accordingly, the unburned portion of the gadolinium compound at the upper and lower portions can be reduced. In the embodiments of FIG. 12 and FIG. 13, the upper and lower end portions are formed as blanket portions thereby to improve the reactivity of the fuel assembly and, furthermore, the water-fuel ratio can be also improved by decreasing of the fuel rods or substituting the fuel rods with the water rods.

Figure 24:
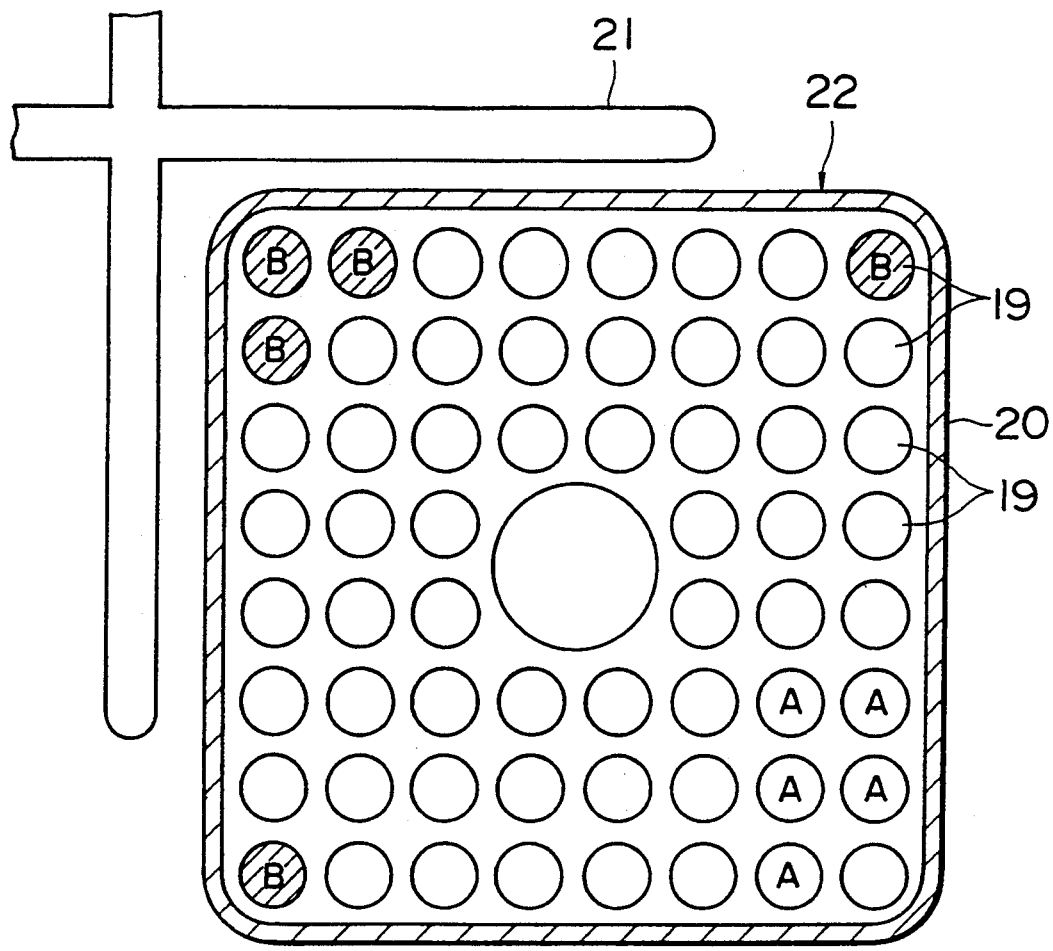
FIG. 24 is a sectional view showing the conception of the fuel assembly for the D lattices core according to the present invention.

FIG. 24 represents one embodiment of the fuel assembly of the reactor core and, in detail, the MOX fuel assembly 22 to be charged in the D lattice core of the BWR of light water reactor. The fuel assembly 22 is composed of fuel rods 19 arranged in n rows and n columns (n=8 in this embodiment) in shape of square lattice in a square cylindrical channel box 20.

The MOX fuel assembly 22 for the D lattice core is provided with water gaps for guiding non-boiled high temperature subcooled water (out-channel water) between the channel boxes 20, and the width of the water gap on the side facing the insertion side of the control rods arranged in cross form is made larger than that of the water gap on the side not facing the control rods. For this arrangement, the thermal neutron flux, i.e. power distribution, of each of the fuel rods 19 is made relatively large at the portion facing the wide water gap in comparison with the other portions. Particularly, supposing that the corner portion of the control rod 21 insertion side is occupied with (1, 1) coordinate (in the channel box) fuel rod and the diagonally opposing portion of the channel box is occupied with (n, n) coordinate fuel rod, the thermal neutron flux from the (1, 1) fuel rod is most high and the thermal neutron fluxes of (1, 2), (2, 1), (1, n) and (n, 1) fuel rods are made subsequently high.

The power of a fuel rod P of the fuel assembly 20 is expressed as follows in accordance with the distribution of such thermal neutron flux $\phi_{th}$.

$$P \propto \phi_{th} \times E_f \qquad (1)$$

wherein $E_f$ represents a macroscopic cross section of a fissile material (uranium, plutonium). The concentrations of the plutonium of the respective fuel rods which is in proportion to the macroscopic cross section $E_f$, are adjusted so that the relative powers between the respective fuel rods 19 do not become extremely different by adjusting the enrichment of the plutonium which is in proportional to the macroscopic cross section $E_f$.

In the MOX fuel assembly 22 for the D lattice core, the uranium fuel rods B are arranged for (1, 1), (1, 2), (2, 1), (1, n) and (n, 1) coordinate fuel rods and the MOX fuel rods are arranged for the other fuel rods 19 except the fuel rods containing the burnable poison such as gadolinium compound. In such fuel assembly 22, three kinds of fuel rods (described hereinlater) having different Pu enrichments are utilized for the MOX fuel rods, and the Pu enrichment of the MOX fuel rods is reduced in number of two kinds in comparison with the embodiment of FIGS. 1 and 2 and an equivalent uranium fuel rod B is utilized for this reduction. The reduction of the plutonium amount charged in one MOX fuel assembly 22 is made small, for example, less than 5%. This is because a smaller number of MOX fuel rods A is substituted with the uranium fuel rods B and, hence, the Pu enrichment at those portions is made small.

Although not shown in FIG. 24, it may be possible that the fuel rod of (1, 1) coordinate is constituted by the uranium fuel rod and the other fuel rods, except for those containing the burnable poison, are constructed by the MOX fuel rods. In such case, it is possible to reduce one kind of the Pu enrichments in comparison with those of the conventional MOX fuel assembly 1B and, accordingly, the reduced amount of the plutonium amount is extremely low and almost zero.

Figure 25:
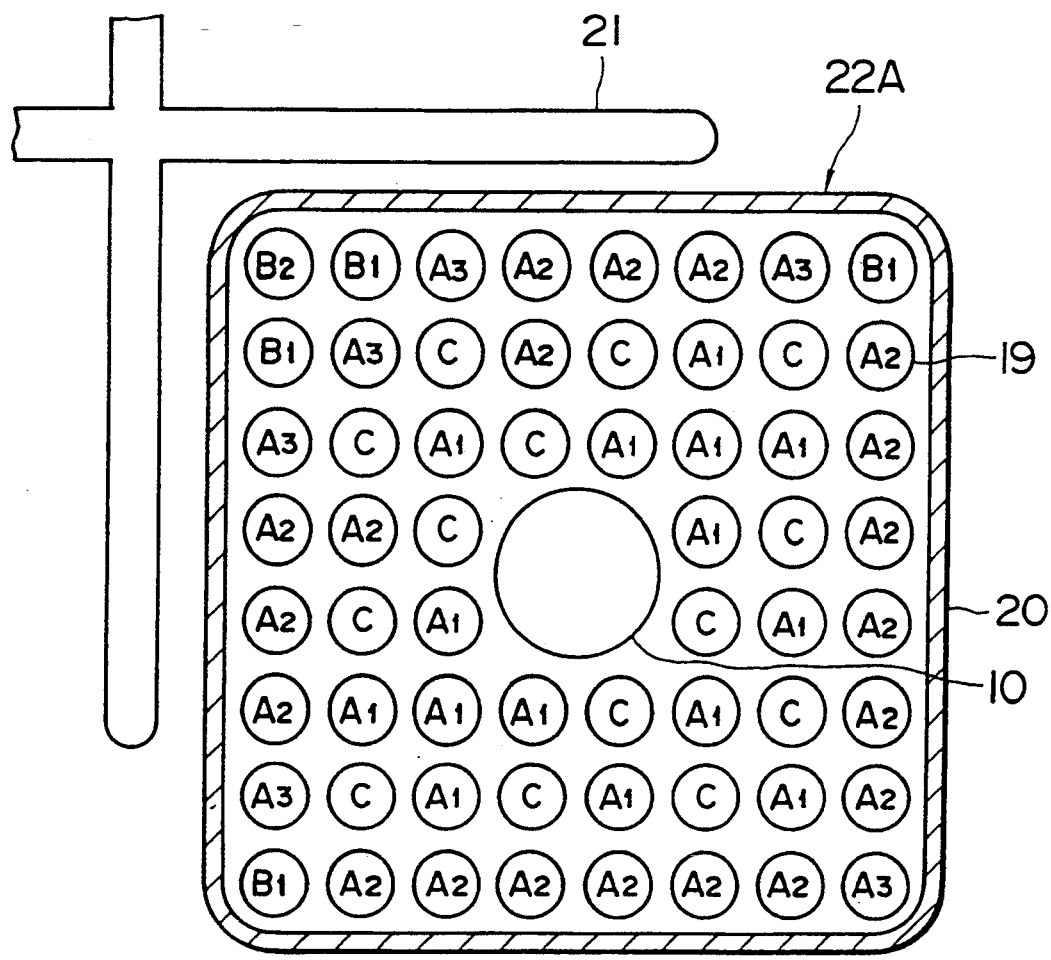
FIG. 25 is a sectional view of one example of the fuel assembly for the D lattice core to which the present invention is applied.
Figure 26:
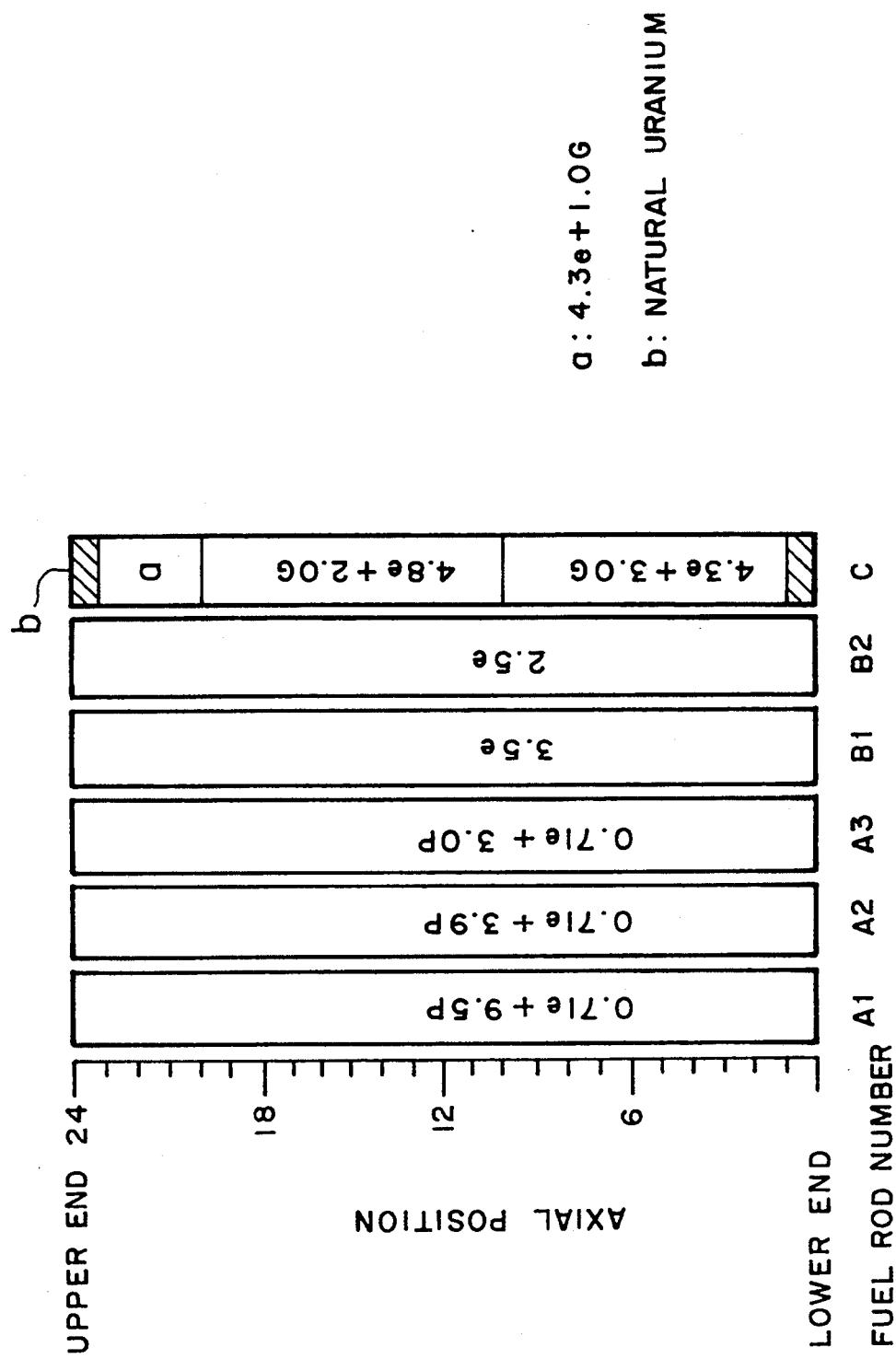
FIG. 26 is a view showing the axial structure of the fuel assembly of FIG. 25.

FIGS. 25 and 26 represent exemplary embodiment of the MOX fuel assembly 22A for the D grid core, which is an example of the replaceable fuel rods to be charged into the D grid core of the BRW as a light water reactor.

The fuel assembly 22A includes a bundle of fuel rods 19 arranged in the channel box 20 in n lines and n rows (n=8 to 10) in a square shape and supported by spacers, not shown. The water rod 10 is also arranged at substantially the central portion of the channel box 20. The upper and lower ends of the water rod 10 and the fuel rods 19 are supported by the upper and lower tie plates, both not shown. A plurality of spacers are arranged in the axial direction of the fuel rods 19 with spaces so as to suitably maintain the spaces between the water rod 10 and the fuel rods 19. In the fuel assembly 22A, the control rods 21 in cross arrangement are also disposed.

Each of the fuel rods 19, though not shown, is composed of a fuel clad into which a plurality of fuel pellets are packed and which has upper and lower ends which are closed by end plugs. The fuel pellet is formed by sintering the fuel material with oxide and includes a fissile material. The fuel pellets are forced downward by the spring means disposed in the gas plenum in the clad.

The water rod 10 is composed of a clad having the same constituting substance as that of the fuel rod 19, but the fuel material is not charged in the water rod 10. The water rod 10 is provided with upper and lower portions having side surfaces to which are formed holes, not shown, through which non-boiled coolant passes into the interior of the water rod 10.

The MOX fuel assembly 22A to be charged into the D grid core is the combination of the MOX fuel rods A and the uranium fuel rods B, and the MOX fuel rods A includes fuel rods $A_1$ in which the plutonium as the fuel material is mixed by 9.5 wt %, for example, with the natural uranium (U-235, 0.71 wt %) and also includes MOX fuel rods $A_2$ and $A_3$ in which the plutoniums are mixed by 3.9 wt % and 3.0 wt %, for example, with the natural uranium, respectively. The uranium fuel rods include fuel rods $B_1$ and $B_2$ containing U-235 as the fuel material having enrichments of 3.5 wt % and 2.5 wt %, respectively. The fuel rods C are of the uranium fuel rods containing the burnable poison of gadolinium compound, for example, and being composed of U-235 having enrichments of 4.8 wt % and 4.3 wt % and mixed gadolinium compound ($Gd_2O_3$).

The relative output distribution of the cross section of each fuel rod 19 at 1/24 to 20/24 region of the MOX fuel assembly 22A shown in FIG. 6 is represented by FIG. 27. It is found from FIG. 27 that this output distribution is almost identical to that of the MOX fuel rod represented by FIGS. 1 and 2.

The MOX fuel rod A of the MOX fuel assembly 22A shown in FIGS. 25 and 26 has three kinds of Pu enrichments and five numbers of two kinds of fuel rods $B_1$ and $B_2$ having different enrichments are utilized as the uranium fuel rods B. In the MOX fuel assembly 22A, the kind of the Pu enrichments is reduced in two numbers in comparison with the embodiment shown in FIGS. 1 and 2.

Figure 28:
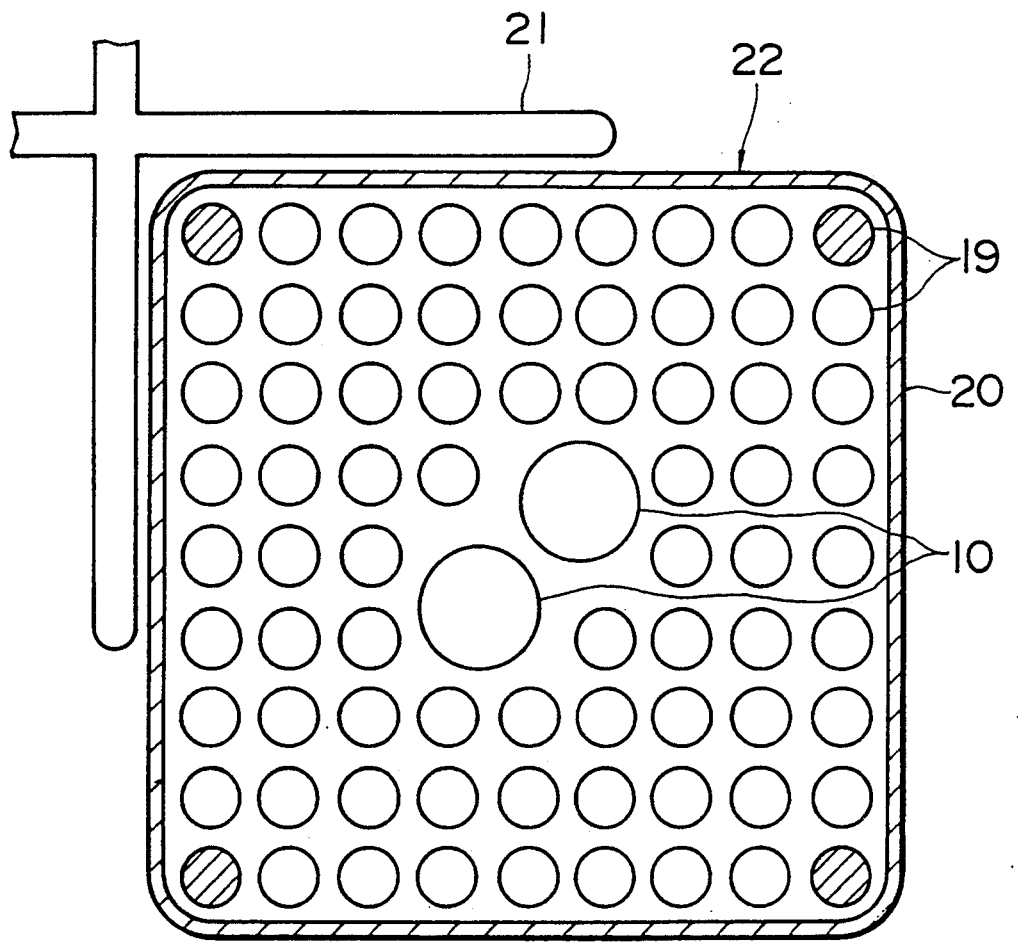
FIG. 28 is a sectional view showing the conception of the fuel assembly for the C lattice core according to the present invention.

FIG. 28 shows a cross section of the fuel assembly 22 of the C grid core.

Referring to FIG. 28, in the MOX fuel assembly 22 to be charged into the C grid core of a reactor is provided with water gaps having the same width between the respective channel boxes 20, so that the fuel rods positioned at four corners of (1, 1), (1, n), (n, 1) and (n, n) coordinates have the relatively increasing thermal neutron fluxes. Reference numeral 10 denotes a water rod.

Accordingly, in the MOX fuel assembly 22, the fuel rods positioned at four corners of (1, 1), (1, n), (n, 1) and (n, n) coordinates are composed of the uranium fuel rods B and the other fuel rods 19 are composed of the MOX fuel rods A except the fuel rods containing the burnable poison. In this embodiment, the Pu enrichments of the MOX fuel rods A has three kinds, and one kind thereof is reduced in comparison with the conventional MOX fuel assembly, which results in the plutonium reduction of less than about 5% per one MOX fuel assembly 22. In case the plutonium reduction amount exceeds about 5%, it is required to increase the number of the MOX fuel assemblies to be charged into the C lattice core, which may adversely affect the fuel economy.

Figure 29:
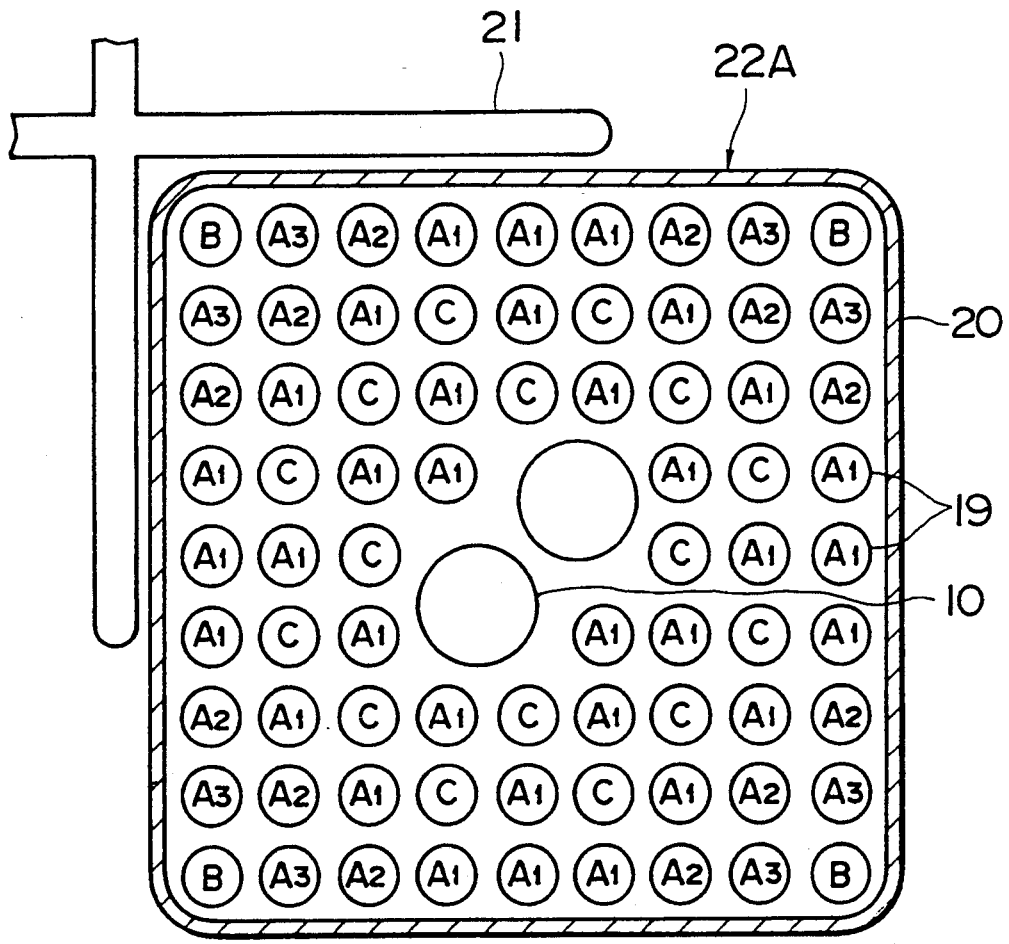
FIG. 29 is a sectional view of one example of the fuel assembly for the C lattice core to which the present invention is applied.
Figure 30:
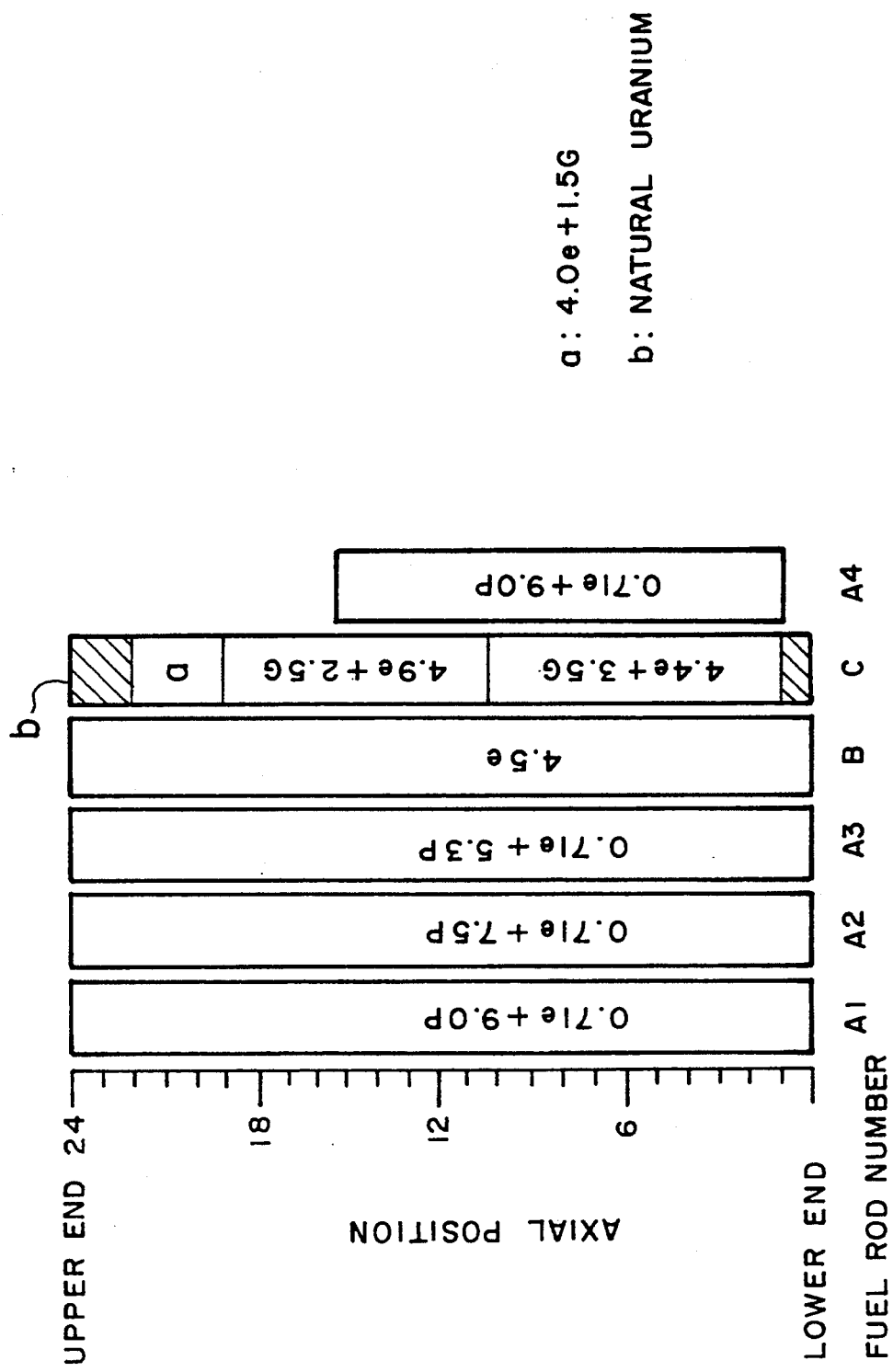
FIG. 30 is a view showing the axial structure of the fuel assembly of FIG. 29.

One example of such an MOX fuel assembly of the C lattice core is represented by FIGS. 29 and 30. FIG. 29 shows the MOX fuel assembly 22A arranged in the channel box 20 in which fuel rods 19 are arranged in 9 lines and 9 rows in a square grid shape and two water rods 10 are arranged at substantially the central portion thereof.

The fuel rods 19 arranged in the channel box 20 include the uranium fuel rods B positioned to the respective corner portions of the channel 20 and the others of the MOX fuel rods A except the fuel rods C including the burnable poison. The MOX fuel rods A includes fuel rods $A_1$ and $A_4$ in which the plutonium as the fuel material is mixed by 9.0 wt %, for example, with the natural uranium (U-235, 0.71 wt % ) and also includes MOX fuel rods $A_2$ and $A_3$ in which the plutoniums are mixed by 7.5 wt % and 5.3 wt %, for example, with the natural uranium, respectively. The uranium fuel rods include fuel rod B containing U-235 as the fuel material having enrichments of 4.5 wt %. The fuel rods C are of the uranium fuel rods including the burnable poison of gadolinium compound, for example, and being composed of U-235 having enrichments of 4.9 wt % and 4.4 wt % and a mixed gadolinium compound ($Gd_2O_3$).

The relative power distribution of the cross section of each fuel rod 19 at 1/24 to 20/24 region of the MOX fuel assembly 22A is represented by FIG. 31. It is found from FIG. 31 that this distribution is almost identical to that of the MOX fuel rod represented by FIGS. 3 and 4.

The MOX fuel rod A of the MOX fuel assembly 22A shown in FIGS. 29 and 30 has three kinds of Pu enrichments of the MOX fuel rods A, and one kind of fuel rods is used as the uranium fuel rods B. The kind of the Pu enrichments is reduced in one or two numbers in comparison with the embodiment of the conventional fuel rods.

In the fuel assembly of the present embodiments described above, in case of the fuel assembly of the D lattice core, the fuel rods positioned to (1, 1) coordinate or (1, 1), (1, 2), (2, 1), (1, n), (n, 1) and (n, n) coordinate positions are composed of the uranium fuel rods and the other fuel rods and in case of the fuel assembly of the C lattice, the fuel rod positioned to (1,1), (1,n), (n,1) and (n,n) coordinate positions; are composed of the MOX fuel rods except those containing the burnable poison. Accordingly, the kind of the Pu enrichments can be reduced without almost changing the plutonium charging amount per one fuel assembly with respect to the conventional MOX fuel assembly. Furthermore, since it is not necessary to manufacture many kinds of the MOX fuel rods different in their Pu enrichment, the MOX fuel assembly hard to be handled can be easily manufactured, thus improving the fuel economy and easily handling the MOX fuel rods.

What is claimed is:

1. A fuel assembly of a nuclear reactor comprising:
    a channel box; and a plurality of fuel rods which comprise
    i) one or more fuel rods which comprise uranium and plutonium, but no burnable poison, and
    ii) one or more fuel rods which comprises uranium at the top and bottom sections of the fuel rods, and between said top and bottom sections, a burnable poison, and at least one of enriched uranium and plutonium, wherein fuel rods ii) contain an upper, middle, and lower section, each of which is between said top and said bottom sections, where in at least one of said fuel rods ii) said upper section has a lower concentration of burnable poison than said middle section, and said middle section has a lower concentration of burnable poison than said lower section, wherein said top and bottom sections consist essentially of natural uranium.

2. A fuel assembly according to claim 1, wherein said fuel rods ii) comprise enriched uranium, but not plutonium, and where in at least one of said fuel rods ii), said middle section has a greater concentration of enriched uranium than at least one of said upper and lower sections.

3. A fuel assembly according to claim 2, wherein one or more of fuel rods i) consists essentially of said uranium and said plutonium,
    and said upper, middle, and lower sections of fuel rods ii) consist essentially of said burnable poison and said enriched uranium, but contain no plutonium, and wherein at least one of said fuel rods ii) said middle section has a greater concentration of enriched uranium, than both of said upper and lower sections.

4. A fuel assembly according to claim 2, wherein each of fuel rods i) comprises natural uranium and wherein these fuel rods do not each contain the same amounts of said plutonium, and wherein fuel rods ii) in the top 1/24 and the bottom 1/24 region of these fuel rods, consist essentially of natural uranium.

5. A fuel assembly according to claim 1, which comprises a water rod having a cross-sectional area equal to that of about four of said fuel rods.

6. A fuel assembly according to claim 1, wherein said fuel rods i) comprise at least one fuel rod which has three sections, wherein the middle section comprises an admixture of plutonium and uranium, and the top and bottom sections contain uranium, but no plutonium.

7. A fuel assembly according to claim 6, wherein fuel rods ii) do not contain plutonium and where in at least one of the fuel rods ii), said middle section has a greater concentration of enriched uranium than at least one of said upper and lower sections.

8. A fuel assembly according to claim 2, wherein each of fuel rods i) comprise as said uranium, natural uranium, and wherein fuel rods ii) in the top 2/24 and the bottom 1/24 region of these fuel rods, consists essentially of natural uranium.

9. A fuel assembly according to claim 8, wherein the fuel rods i) do not all contain the same amount of plutonium, and wherein at least one of the fuel rods i) is shorter than the other fuel rods of i).

10. A fuel assembly according to claim 1, wherein at least one of fuel rods ii) said middle section and said upper section have the same concentration of enriched uranium, which is greater than that of said lower section.

11. A fuel assembly according to claim 1, wherein fuel rods ii) contain enriched uranium, where in at least one of these fuel rods ii), said lower section and said middle section have the same concentration of enriched uranium, which is greater than that of said upper sections.

12. A fuel assembly according to claim 1, wherein said fuel rods ii) comprises plutonium.

13. A fuel assembly according to claim 12, wherein said fuel rods ii) consists essentially of burnable poison, natural uranium, and plutonium.

14. A fuel assembly according to claim 13, wherein each of fuel rods i) comprise top and bottom sections which consist essentially of natural uranium wherein the fuel rods of i) do not all contain the same amount of plutonium, and wherein said upper, middle, and lower sections of at least one of fuel rods ii) comprise the same amount of plutonium.

15. A fuel assembly according to claim 13, wherein each of fuel rods i) comprise sections which consist essentially of natural uranium on the top and bottom, wherein the fuel rods of i) do not all contain the same amount of plutonium, and wherein said middle section of at least one of fuel rods ii) comprises more plutonium then said upper and lower sections.

16. A fuel assembly according to claim 1, wherein the fuel rods i) comprise as said uranium, depleted uranium or recycled uranium, or either of these admixed with natural uranium.

17. A fuel assembly according to claim 12, wherein each of fuel rods i) comprise sections which consist essentially of natural uranium on the top and bottom, wherein the fuel rods of i) do not all contain the same amount of plutonium, wherein at least one of the fuel rods i) comprises two sections, wherein the upper section has a greater concentration of plutonium than the lower section.

18. A fuel assembly according to claim 12, wherein each of fuel rods i) comprise sections which consist essentially of natural uranium on the top and bottom, wherein the fuel rods of i) do not all contain the same amount of plutonium, and wherein said middle section of at least one of fuel rods ii) comprises more plutonium than said upper and lower sections.

19. A fuel assembly according to claim 1, wherein the ratio of the number of fuel rods which comprise at least 80% burnable poison to the total number of fuel rods is 0.15 to 0.22, and the ratio of fuel rods which comprise a uranium-plutonium mixture to the total number of fuel rods is 0.2 to 0.5.

20. A fuel assembly according to claim 1, wherein the ratio of the number of fuel rods which comprise at least 80% of burnable poison, to the total number of fuel rods is 0.18 to 0.25, and the ratio of fuel rods which comprise a uranium-plutonium mixture to the total number of fuel rods, is 0.5 to 0.8.

21. A fuel assembly according to claim 1, wherein said top section is adjacent to said upper section, said upper section is adjacent to said middle section, said middle section is adjacent to said lower section, and said lower section is adjacent to said bottom section.

22. A fuel assembly according to claim 1, wherein the upper, middle, and lower sections each contain enriched uranium.

23. A fuel assembly according to claim 22, wherein the middle section contains a greater concentration of enriched uranium than either the upper or lower sections.

24. A fuel assembly according to claim 1, wherein the upper, middle, and lower sections each contain plutonium.

25. A fuel assembly according to claim 24, wherein the middle section contains a greater concentration of plutonium than either the upper or lower sections.

26. A fuel assembly according to claim 1, wherein the upper section is 3/24 to 4/24; the middle section is 9/24 to 10/24; and the lower section is 8/24 to 9/24, of the axial length of the fuel rod (ii).

27. A fuel assembly according to claim 1, wherein the top section is 1/24 to 2/24 and the bottom section is 1/24 to 2/24 of the axial length of the fuel rod (ii).

28. A fuel assembly according to claim 1 wherein fuel rods (ii) include no plutonium.

29. A fuel assembly according to claim 1, wherein each of the fuel rods (i) packed with said uranium-plutonium mixture fuel is provided with a plenum having a length which exceeds the length of an uranium fuel rod (i) by a maximum of 15 cm.

30. A fuel assembly according to claim 1, wherein fuel rods which have a combined cross sectional area of more than 6% of the cross sectional area of the total fuel rods arranged in the channel box, are substituted with a water rod through which non-boiled water flows or is removed.

31. A fuel assembly according to claim 1, wherein the fuel rods (i) packed with said uranium-plutonium fuel mixture comprise at least one of depleted uranium of U-235 having weight percent lower than that of natural uranium, natural uranium, reprocessed recycled uranium, and enriched uranium.

* * * * *